US012659500B2

(12) United States Patent
Tian et al.

(10) Patent No.: US 12,659,500 B2
(45) Date of Patent: Jun. 16, 2026

(54) BITSTREAM SYNTAX FOR MESH MOTION FIELD CODING

(71) Applicant: TENCENT AMERICA LLC, Palo Alto, CA (US)

(72) Inventors: Jun Tian, Belle Mead, NJ (US); Xiaozhong Xu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 104 days.

(21) Appl. No.: 18/463,480

(22) Filed: Sep. 8, 2023

(65) Prior Publication Data

US 2024/0236352 A1 Jul. 11, 2024

Related U.S. Application Data

(60) Provisional application No. 63/437,969, filed on Jan. 9, 2023.

(51) Int. Cl.
| | |
|---|---|
| *H04N 7/12* | (2006.01) |
| *H04N 19/172* | (2014.01) |
| *H04N 19/177* | (2014.01) |
| *H04N 19/44* | (2014.01) |
| *H04N 19/597* | (2014.01) |
| *H04N 19/70* | (2014.01) |

(52) U.S. Cl.
CPC ........... *H04N 19/44* (2014.11); *H04N 19/172* (2014.11); *H04N 19/177* (2014.11); *H04N 19/597* (2014.11); *H04N 19/70* (2014.11)

(58) Field of Classification Search
CPC .................................................... H04N 19/597
See application file for complete search history.

(56) References Cited

U.S. PATENT DOCUMENTS

2020/0302650 A1 9/2020 Aksu et al.

FOREIGN PATENT DOCUMENTS

| WO | 2020/008106 A1 | 1/2020 |
|---|---|---|
| WO | 2020/072842 A1 | 4/2020 |

OTHER PUBLICATIONS

International Search Report issued Jan. 22, 2024 in Application No. PCT/US 23/32468.
Written Opinion issued Jan. 22, 2024 in Application No. PCT/US 23/32468.
"V-DMC Test Model v2 (TMM v2)", ISO/IEC JTC 1/SC 29/WG 7 N00456, Serial No. 22119, Oct. 2022, 2 pages, Mainz.
(Continued)

*Primary Examiner* — Y Lee
(74) *Attorney, Agent, or Firm* — Sughrue Mion, PLLC

(57) ABSTRACT

A method and apparatus including computer code configured to cause a processor or processors to receive a bitstream including a mesh representing an encoded volumetric data of at least one three-dimensional (3D) visual content, the mesh including a group of frames including a current frame and a reference frame, obtain, from the received bitstream, a high-level syntax indicating a motion field for the mesh, and the motion field includes a difference between a first vertex position in the current frame and a second vertex position in the reference frame, and decode the mesh based at least on the high-level syntax.

20 Claims, 24 Drawing Sheets

(56)           References Cited

OTHER PUBLICATIONS

Khaled Mammou et al., "[V-CG] Apple's Dynamic Mesh Coding CfP Response", 138. MPEG Meeting; Apr. 25, 2022-Apr. 29, 2022; (Motion Picture Expert Group or ISO/IEC JTC1/SC29/WG11), Apple, Inc., Online, Apr. 29, 2022. 24 pages total.
"WD 4.0 of V-DMC", 143. Mpeg Meeting; Jul. 17, 2023-Jul. 21, 2023; Geneva; (Motion Picture Expert Group or ISO/IEC JTC1/SC29/WG11), Sep. 4, 2023, XP030323752,145 pages total.
Extended European Search Report issued Mar. 5, 2026 in EP Application No. 23904794.7.

| | Descriptor |
|---|---|
| If (frameType == Inter) {<br>motionFieldCoding() {<br>frameHeader()<br>framePayload() | |

| frameHeader( ) { | Descriptor |
| --- | --- |
| frameIndex; | u(8) |
| referenceFrameIndex; | u(8) |
| ~ | |

| framePayload() { | Descriptor |
|---|---|
| bitstreamByteSize; | u(32) |
| bitstream; | |
| } | |

Figure 24:
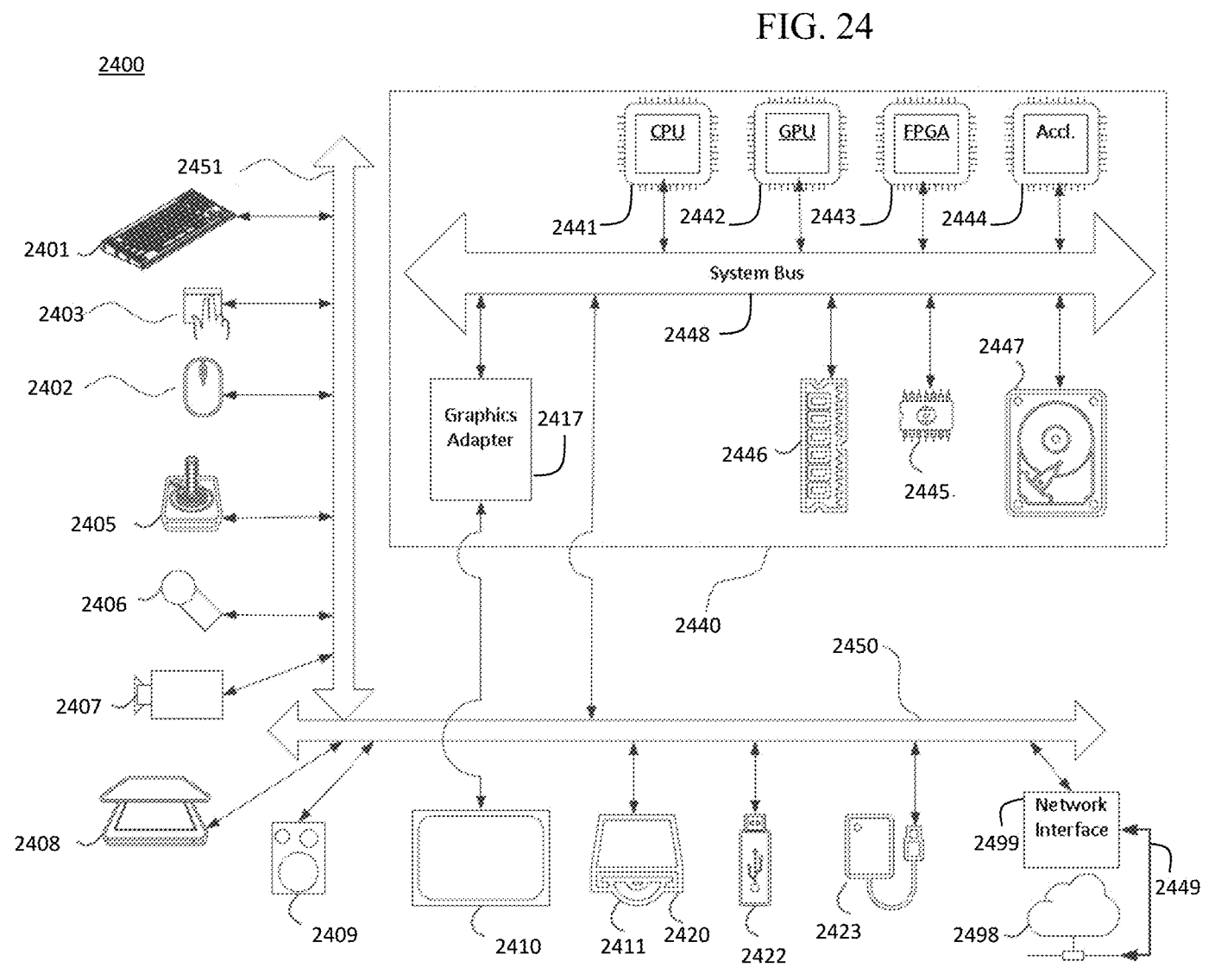

Network Interface

2449

2441

2442

2443

2444

CPU

GPU

FPGA

Accl.

System Bus

2448

2446

2445

2447

Graphics Adapter

2417

2440

2451

BITSTREAM SYNTAX FOR MESH MOTION FIELD CODING

CROSS REFERENCE TO RELATED APPLICATION

The present application claims priority to provisional application U.S. 63/437,969 filed on Jan. 9, 2023 which is hereby expressly incorporated by reference, in its entirety, into the present application.

BACKGROUND

1. Field

The present disclosure is directed a set of advanced video coding technologies including bitstream syntax for mesh motion field coding.

2. Description of Related Art

The advances in 3D capture, modeling, and rendering have promoted the ubiquitous presence of 3D contents across several platforms and devices. Nowadays, it is possible to capture a baby's first step in one continent and allow the grandparents to see (and maybe interact) and enjoy a full immersive experience with the child in another continent. Nevertheless, in order to achieve such realism, models are becoming ever more sophisticated, and a significant amount of data is linked to the creation and consumption of those models.

VMesh is an ongoing MPEG standard to compress the static and dynamic mesh. VMesh separates the input mesh into a simplified base mesh and a residual mesh. The base mesh may be encoded at high quality while the remainder mesh may be encoded with subdivision surface fitting and displacement encoding to exploit local characteristic.

However, a complex mesh often contains information about multiple instances to relate associate texture maps. This information is available at the encoding time. On the other hand, a mesh could be segmented into several parts based on their characteristics. For example, there are more polygons in the face region of a human mesh.

As such, a constant quantization step size applied for all instances, objects, parts in mesh leads to a large quantization error, mesh regions may not be not equally important, the number of faces may be varied significantly in different parts of a mesh, and a base mesh could be simpler than original mesh and the displacement, thus could require less accuracy in bitdepth.

Also, a dynamic mesh sequence may require a large amount of data since it may consist of a significant amount of information changing over time. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. MPEG is planning to develop a new mesh compression standard to directly handle dynamic meshes with time varying connectivity information and optionally time varying attribute maps.

And for any of those reasons there is therefore a desire for technical solutions to such problems that arose in video coding technology.

SUMMARY

There is included a method and apparatus comprising memory configured to store computer program code and a processor or processors configured to access the computer program code and operate as instructed by the computer program code. The computer program is configured to cause the processor implement receiving code configured to cause the at least one processor to receive a bitstream comprising a mesh representing an encoded volumetric data of at least one three-dimensional (3D) visual content, the mesh comprising a group of frames including a current frame and a reference frame, obtaining code configured to cause the at least one processor to obtain, from the received bitstream, a high-level syntax indicating a motion field for the mesh, wherein the motion field comprises a difference between a first vertex position in the current frame and a second vertex position in the reference frame, and decoding code configured to cause the at least one processor to decode the mesh based at least on the high-level syntax.

According to exemplary embodiments, decoding the mesh is further based on arithmetic coding-based displacement coding.

According to exemplary embodiments, the syntax element indicating the motion field for the mesh includes:

```
bmesh_submesh_layer_rbsp( ){
    submesh_header( )
    submesh_data_unit( mfh_submesh_type, SubMeshUnitSize )
    rbsp_trailing_bits( )
}.
```

According to exemplary embodiments, the syntax element indicating the motion field for the mesh comprises a frame header and a frame payload, the frame header comprises a frame index followed by a reference frame index, and the frame header indicates the reference frame index in an inter mode.

According to exemplary embodiments, in the case that the frame header indicates the inter type, the frame index consists of 8 bits, the reference frame index consists of 8 bits, and the frame payload consists of a Z-bit integer where Z consists of 32 bits.

According to exemplary embodiments, the frame header consists of the frame index and the reference frame index.

According to exemplary embodiments, the frame payload comprises a Z-bit integer followed by a coded bitstream, the Z-bit integer specifies a byte size of the coded bitstream, and the coded bitstream includes a coded representation of displacement vectors, including the first displacement vector, of the first frame.

According to exemplary embodiments, the frame payload consists of the Z-bit integer and the coded bitstream, and Z is 32.

According to exemplary embodiments, the processor is further configured to execute the instructions to obtain a concatenation of the groups of frames, obtaining, from a first displacement bitstream of a first one of the groups of frames, a first displacement vector of a first frame of the mesh motion field of the 3D visual content, obtaining, after decoding the first frame and from a second one of the groups of frames, a second displacement vector of a second frame of the mesh motion field the 3D visual content, and decoding the second frame of the 3D visual content based on the second displacement vector, and the first one of the groups of frames includes a first sequence header bitstream, a first base mesh bitstream, the first displacement bitstream, and a first texture bitstream, and the second one of the groups of frames includes a second sequence header bitstream, a second base mesh bitstream, the second displacement bitstream, and a second texture bitstream.

BRIEF DESCRIPTION OF THE DRAWINGS

Further features, nature, and various advantages of the disclosed subject matter will be more apparent from the following detailed description and the accompanying drawings in which:

FIG. 3 is a simplified illustration in accordance with embodiments;

FIG. 5 is a simplified illustration in accordance with embodiments;

FIG. 6 is a simplified illustration in accordance with embodiments;

FIG. 15 is a simplified illustration in accordance with embodiments;

FIG. 19 is a simplified illustration in accordance with embodiments;

FIG. 20 is a simplified illustration in accordance with embodiments;

FIG. 21 is a simplified illustration in accordance with embodiments;

FIG. 22 is a simplified illustration in accordance with embodiments;

FIG. 24 is a simplified illustration in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
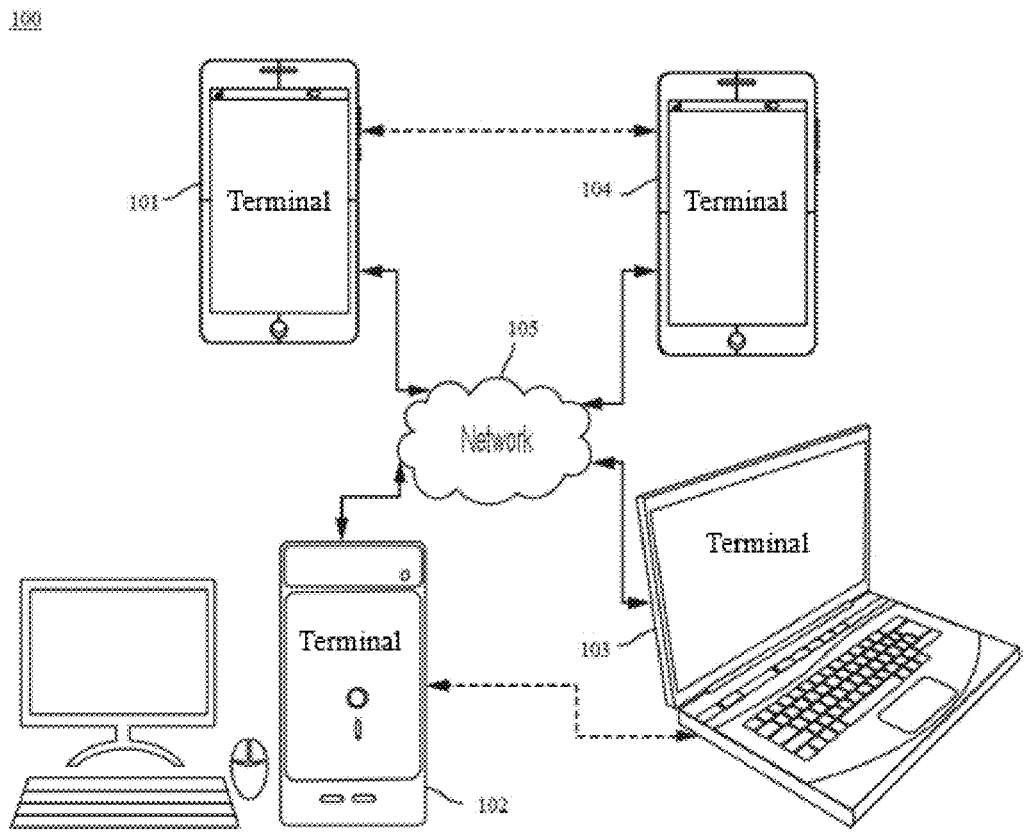
FIG. 1 is a schematic illustration of a diagram in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
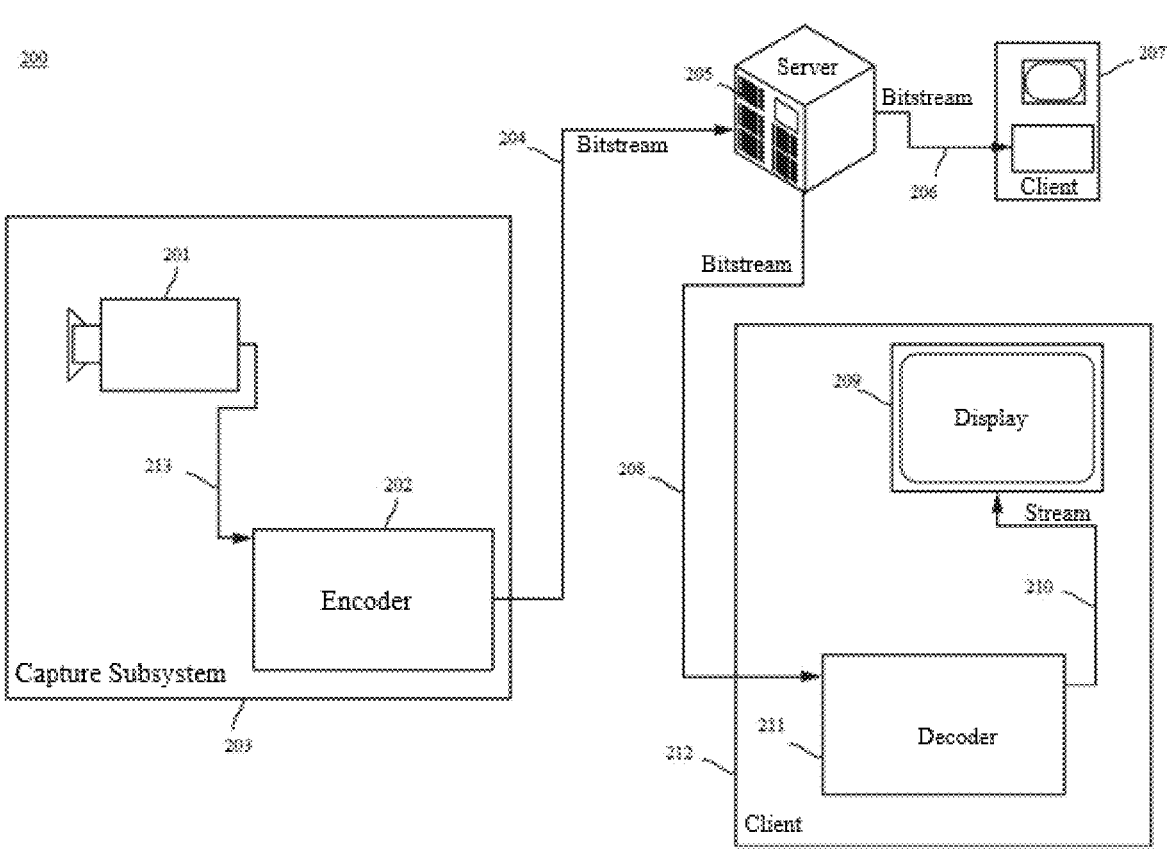
FIG. 2 is a simplified block diagram in accordance with embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201, which may be for example a camera as discussed above. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
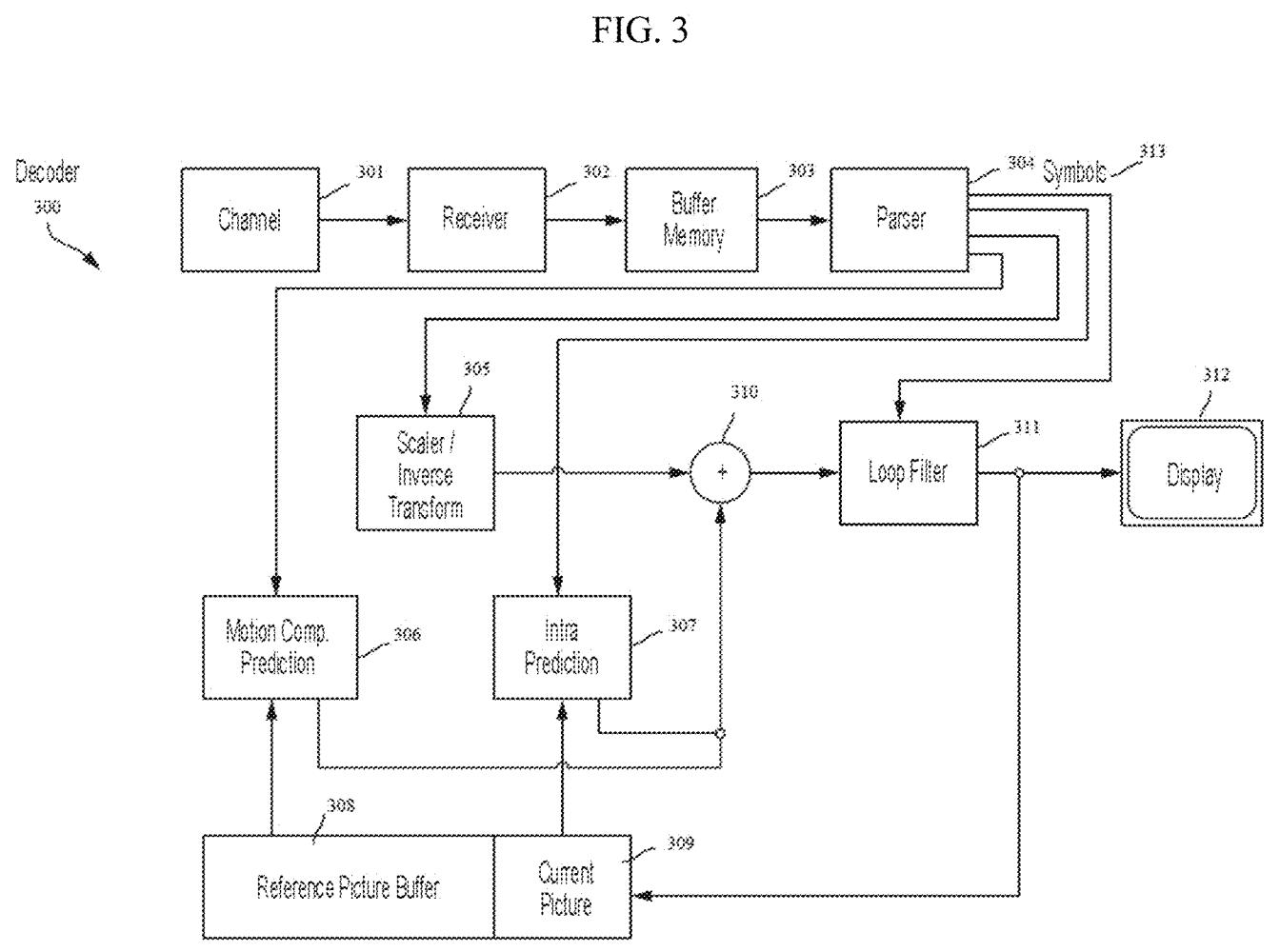

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information (VUI) parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
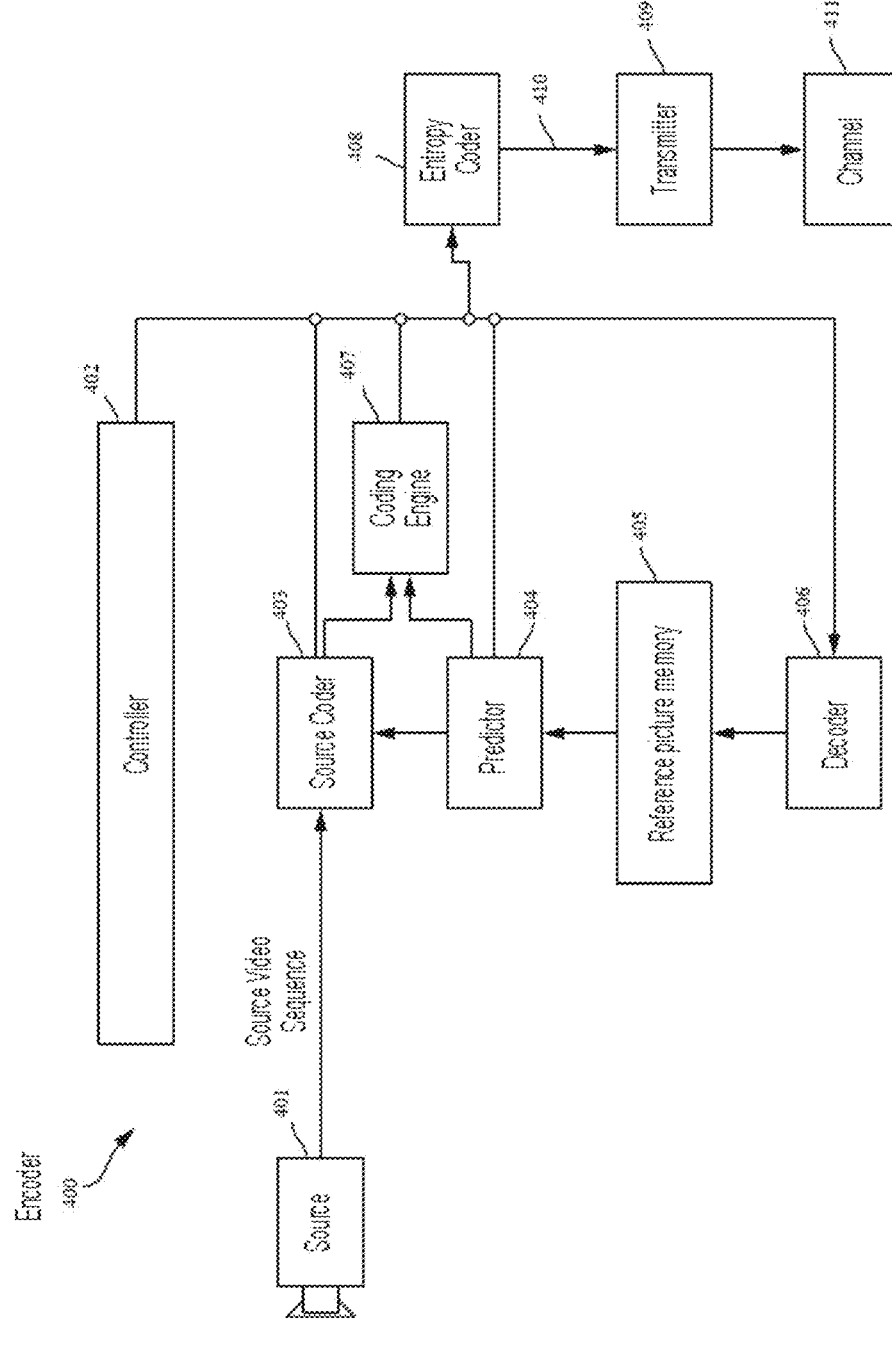
FIG. 4 is a simplified illustration in accordance with embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an over-simplified description, a coding loop can consist of the encoding part of an encoder 400 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture memory 405, which may be for example a cache. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the source coder 403, which may be for example a video coder, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the source coder 403 with other data to be transmitted, for example, coded audio data and/or ancillary data streams (sources not shown). The controller 402 may manage operation of the encoder 400. During coding, the controller 402 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The encoder 400, which may be for example a video coder, may perform coding operations according to a predetermined video coding technology or standard, such as ITU-T Rec. H.265. In its operation, the encoder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence.

Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
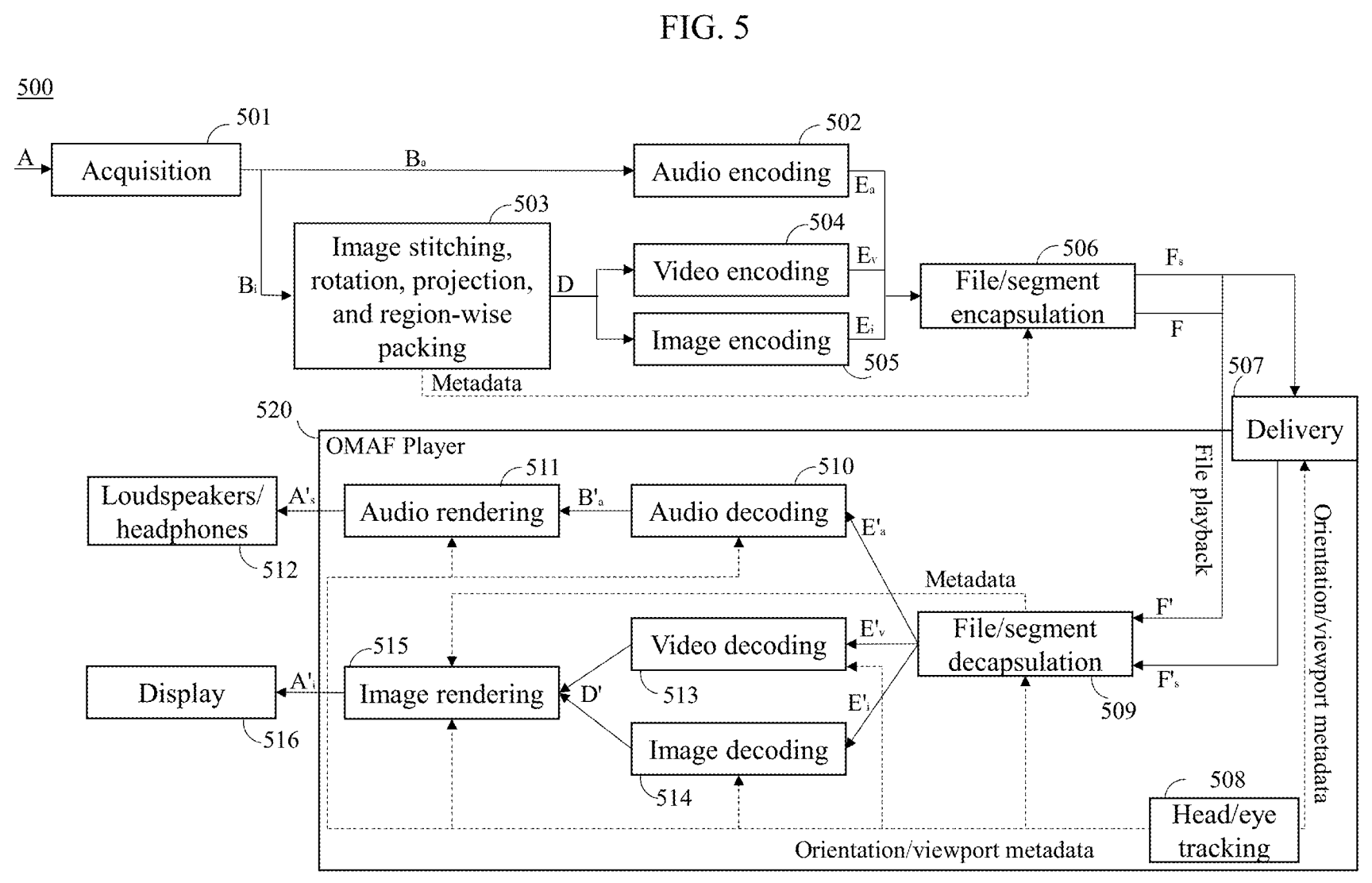

FIG. 5 illustrates a simplified block-style workflow diagram 500 of exemplary view-port dependent processing an in Omnidirectional Media Application Format (OMAF) that may allow for 360-degree virtual reality (VR360) streaming described in OMAF.

At acquisition block 501, video data A is acquired, such as data of multiple images and audio of same time instances in a case that the image data may represent scenes in VR360. At processing block 503, the images $B_i$ of the same time instance are processed by one or more of being stitched, mapped onto a projected picture with respect to one or more virtual reality (VR) angles or other angles/viewpoint(s) and region-wise packed. Additionally, metadata may be created indicating any of such processed information and other information so as to assist in delivering and rendering processes.

With respect to data D, at image encoding block 505, the projected pictures are encoded to data $E_i$ and composed into a media file, and in viewport-independent streaming, and at video encoding block 504, the video pictures are encoded as data $E_v$ as a single-layer bitstream, for example, and with respect to data $B_a$ the audio data may also be encoded into data $E_a$ at audio encoding block 502.

The data $E_a$, $E_v$, and $E_i$, the entire coded bitstream Fi and/or F may be stored at a (content delivery network (CDN)/cloud) server, and typically may be fully transmitted, such as at delivery block 507 or otherwise, to an OMAF player 520 and may be fully decoded by a decoder such that at least an area of a decoded picture corresponding to a current viewport is rendered to the user at display block 516 with respect to the various metadata, file playback, and orientation/viewport metadata, such as an angle at which a user may be looking through a VR image device with respect to viewport specifications of that device, from the head/eye tracking block 508. A distinct feature of VR360 is that only a viewport may be displayed at any particular time, and such feature may be utilized to improve the performance of omnidirectional video systems, through selective delivery depending on the user's viewport (or any other criteria, such as recommended viewport timed metadata). For example, viewport-dependent delivery may be enabled by tile-based video coding according to exemplary embodiments.

As with the encoding blocks described above, the OMAF player 520 according to exemplary embodiments may similarly reverse one or more facets of such encoding with respect to the file/segment decapsulation of one or more of the data F' and/or F'$_i$ and metadata, decode the audio data E'$_i$ at audio decoding block 510, the video data E'$_v$ at video decoding block 513, and the image data E'$_i$ at image decoding block 514 to proceed with audio rendering of the data B'$_a$ at audio rendering block 511 and image rendering of the data D' at image rendering block 515 so as to output, in a VR360 format according to various metadata such as the orientation/viewport metadata, display data A'$_i$ at display block 516 and audio data A'$_s$ at the loudspeakers/headphones block 512. The various metadata may influence ones of the data decoding and rendering processes depending on various tracks, languages, qualities, views, that may be selected by or for a user of the OMAF player 520, and it is to be understood that the order of processing described herein is presented for exemplary embodiments and may be implemented in other orders according to other exemplary embodiments.

Figure 6:
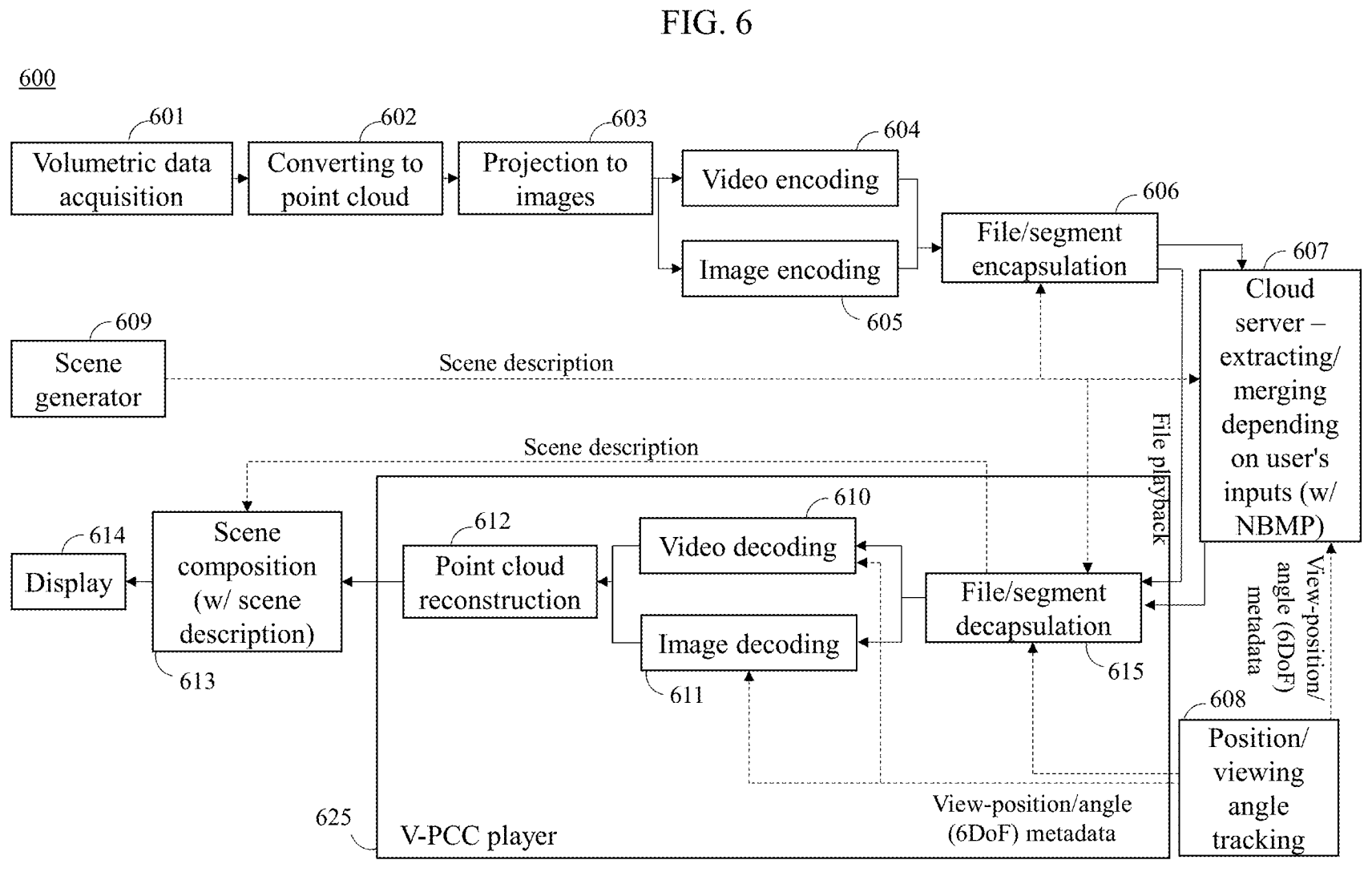

FIG. 6 illustrates a simplified block-style content flow process diagram 600 for (coded) point cloud data with view-position and angle dependent processing of point cloud data (herein "V-PCC") with respect to capturing/generating/(de)coding/rendering/displaying 6 degree-of-freedom media. It is to be understood that the described features may be used separately or combined in any order and elements such as for encoding and decoding, among others illustrated, may be implemented by processing circuitry (e.g., one or more processors or one or more integrated circuits), and the one or more processors may execute a program that is stored in a non-transitory computer-readable medium according to exemplary embodiments.

The diagram 600 illustrates exemplary embodiments for streaming of coded point cloud data according to V-PCC.

At the volumetric data acquisition block 601, a real-world visual scene or a computer-generated visual scene (or combination of them) may be captured by a set of camera devices or synthesized by a computer as a volumetric data, and the volumetric data, which may have an arbitrary format, may be converted to a (quantized) point cloud data format, through image processing at the converting to point cloud block 602. For example, data from the volumetric data may be area data by area data converted into ones of points of the point cloud by pulling one or more of the values described below from the volumetric data and any associated data into a desired point cloud format according to exemplary embodiments. According to exemplary embodiments, the volumetric data may be a 3D data set of 2D images, such as slices from which a 2D projection of the 3D data set may be projected for example. According to exemplary embodiments, point cloud data formats include representations of data points in one or more various spaces and may be used to represent the volumetric data and may offer improvements with respect to sampling and data compression, such as with respect to temporal redundancies, and, for example, a point cloud data in an x, y, z, format representing, at each point of multiple points of the cloud data, color values (e.g., RGB, etc.), luminance, intensity, etc. and could be used with progressive decoding, polygon meshing, direct rendering, octree 3D representations of 2D quadtree data.

At projection to images block 603, the acquired point cloud data may be projected onto 2D images and encoded as image/video pictures with video-based point cloud coding (V-PCC). The projected point cloud data may be composed of attributes, geometry, occupancy map, and other metadata used for point cloud data reconstruction such as with painter's algorithms, ray casting algorithms, (3D) binary space partition algorithms, among others for example.

At the scene generator block 609, on the other hand, a scene generator may generate some metadata to be used for rendering and displaying 6 degrees-of-freedom (DoF) media, by a director's intention or a user's preference for example. Such 6 DoF media may include the 360VR like 3D viewing of a scene from rotational changes on 3D axis X, Y, Z in addition to additional dimension allowing for movement front/back, up/down, and left/right with respect to a virtual experience within or at least according to point cloud coded data. The scene description metadata defines one or more scene composed of the coded point cloud data and other media data, including VR360, light field, audio, etc. and may be provided to one or more cloud servers and or file/segment encapsulation/decapsulation processing as indicated in FIG. 6 and related descriptions.

After video encoding block 604 and image encoding block 605 similar to the video and image encoding described above (and as will be understood, audio encoding also may be provided as described above), file/segment encapsulation block 606 processes such that the coded point cloud data are composed into a media file for file playback or a sequence of an initialization segment and media segments for streaming according to a particular media container file format such as one or more video container formats and such as may be used with respect to DASH described below, among others as such descriptions represent exemplary embodiments. The file container also may include the scene description metadata, such as from the scene generator block 1109, into the file or the segments.

According to exemplary embodiments, the file is encapsulated depending on the scene description metadata to include at least one view position and at least one or more angle views at that/those view position(s) each at one or more times among the 6 DoF media such that such file may be transmitted on request depending on user or creator input. Further, according to exemplary embodiments, a segment of such file may include one or more portions of such file such as a portion of that 6 DoF media indicating a single viewpoint and angle thereat at one or more times; however, these are merely exemplary embodiments and may be changed depending on various conditions such as network, user, creator capabilities and inputs.

According to exemplary embodiments, the point cloud data is partitioned into multiple 2D/3D regions, which are independently coded such as at one or more of video encoding block 604 and image encoding block 605. Then, each independently coded partition of point cloud data may encapsulated at file/segment encapsulation block 606 as a track in a file and/or segment. According to exemplary embodiments, each point cloud track and/or a metadata track may include some useful metadata for view-position/angle dependent processing.

According to exemplary embodiments, the metadata, such as included in a file and/or segment encapsulated with respect to the file/segment encapsulation block, useful for the view-position/angle dependent processing includes one or more of the following: layout information of 2D/3D partitions with indices, (dynamic) mapping information associating a 3D volume partition with one or more 2D partitions (e.g. any of a tile/tile group/slice/sub-picture), 3D positions of each 3D partition on a 6 DoF coordinate system, representative view position/angle lists, selected view position/angle lists corresponding to a 3D volume partition, indices of 2D/3D partitions corresponding to a selected view position/angle, quality (rank)information of each 2D/3D partition, and rendering information of each 2D/3D partition for example depending on each view position/angle. Calling on such metadata when requested, such as by a user of the V-PCC player or as directed by a content creator for the user of the V-PCC player, may allow for more efficient processing with respect to specific portions of the 6 DoF media desired with respect to such metadata such that the V-PCC player may deliver higher quality images of focused on portions of the 6 DoF media than other portions rather than delivering unused portions of that media.

From the file/segment encapsulation block 606, the file or one or more segments of the file may be delivered using a delivery mechanism (e.g., by Dynamic Adaptive Streaming over HTTP (DASH)) directly to any of the V-PCC player 625 and a cloud server, such as at the cloud server block 607 at which the cloud server can extract one or more tracks and/or one or more specific 2D/3D partitions from a file and may merge multiple coded point cloud data into one data.

According to data such as with the position/viewing angle tracking block 608, if the current viewing position and angle(s) is/are defined on a 6 DoF coordinate system, at a client system, then the view-position/angle metadata may be delivered, from the file/segment encapsulation block 606 or otherwise processed from the file or segments already at the cloud server, at cloud server block 607 such that the cloud sever may extract appropriate partition(s) from the store file(s) and merge them (if necessary) depending on the metadata from the client system having the V-PCC player 625 for example, and the extracted data can be delivered to the client, as a file or segments.

With respect to such data, at the file/segment decapsulation block 615, a file decapsulator processes the file or the received segments and extracts the coded bitstreams and parses the metadata, and at video decoding and image decoding blocks 610 and 611, the coded point cloud data are then decoded into decoded and reconstructed, at point cloud reconstruction block 612, to point cloud data, and the reconstructed point cloud data can be displayed at display block 614 and/or may first be composed depending on one or more various scene descriptions at scene composition block 613 with respect to scene description data according to the scene generator block 609.

In view of the above, such exemplary V-PCC flow represents advantages with respect to a V-PCC standard including one or more of the described partitioning capabilities for multiple 2D/3D areas, a capability of a compressed domain assembly of coded 2D/3D partitions into a single conformant coded video bitstream, and a bitstream extraction capability of coded 2D/3D of a coded picture into conformant coded bitstreams, where such V-PCC system support is further improved by including container formation for a VVC bitstream to support a mechanism to contain metadata carrying one or more of the above-described metadata.

In that light and according to exemplary embodiments further described below, the term "mesh" indicates a composition of one or more polygons that describe the surface of a volumetric object. Each polygon is defined by its vertices in 3D space and the information of how the vertices are connected, referred to as connectivity information. Optionally, vertex attributes, such as colors, normals, etc., could be associated with the mesh vertices. Attributes could also be associated with the surface of the mesh by exploiting mapping information that parameterizes the mesh with 2D attribute maps. Such mapping may be described by a set of parametric coordinates, referred to as UV coordinates or texture coordinates, associated with the mesh vertices. 2D attribute maps are used to store high resolution attribute information such as texture, normals, displacements etc. Such information could be used for various purposes such as texture mapping and shading according to exemplary embodiments.

Nonetheless, a dynamic mesh sequence may require a large amount of data since it may consist of a significant amount of information changing over time. For example, in contrast to a "static mesh", or "static mesh sequence," in which information of that mesh may not change from one frame to another, a "dynamic mesh", or a "dynamic mesh sequence", indicates motion in which ones of vertices represented by that mesh change from one frame to another. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. According to exemplary embodiments herein, there is described aspects of a new mesh compression standards to directly handle dynamic meshes with time varying connectivity information and optionally time varying attribute maps, this standard targets lossy, and lossless compression for various applications, such as real-time communications, storage, free viewpoint video, AR and VR. Functionalities such as random access and scalable/progressive coding are also considered.

Figure 7:
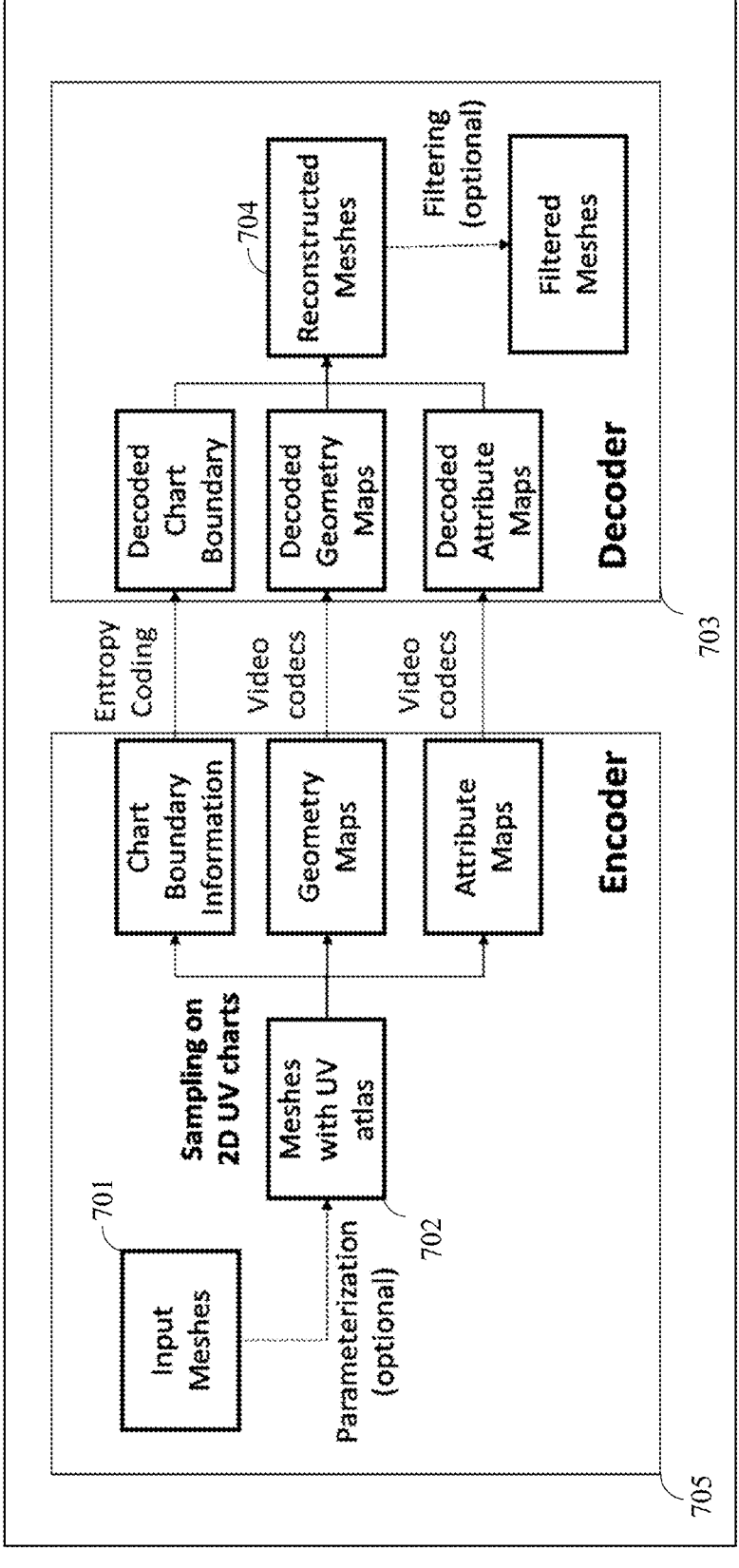
FIG. 7 is a simplified illustration in accordance with embodiments.

FIG. 7 represents an example framework 700 of one dynamic mesh compression such as for a 2D atlas sampling based method. Each frame of the input meshes 701 can be preprocessed by a series of operations, e.g., tracking, remeshing, parameterization, voxelization. Note that, these operations can be encoder-only, meaning they might not be part of the decoding process and such possibility may be signaled in metadata by a flag such as indicating 0 for encoder only and 1 for other. After that, one can get the meshes with 2D UV atlases 702, where each vertex of the mesh has one or more associated UV coordinates on the 2D atlas. Then, the meshes can be converted to multiple maps, including the geometry maps and attribute maps, by sampling on the 2D atlas. Then these 2D maps can be coded by video/image codecs, such as HEVC, VVC, Av1, AVS3, etc. On the decoder 703 side, the meshes can be reconstructed from the decoded 2D maps. Any post-processing and filtering can also be applied on the reconstructed meshes 704. Note that other metadata might be signaled to the decoder side for the purpose of 3D mesh reconstruction. Note that the chart boundary information, including the uv and xyz coordinates, of the boundary vertices can be predicted, quantized and entropy coded in the bitstream. The quantization step size can be configured in the encoder side to tradeoff between the quality and the bitrates.

In some implementations, a 3D mesh can be partitioned into several segments (or patches/charts), one or more 3D mesh segments may be considered to be a "3D mesh" according to exemplary embodiments. Each segment is composed of a set of connected vertices associated with their geometry, attribute, and connectivity information. As illustrated in the example 800 of volumetric data in FIG. 8, the UV parameterization process 802 of mapping from 3D mesh segments onto 2D charts, such as to the above noted 2D UV atlases 702 block, maps one or more mesh segments 801 onto a 2D chart 803 in the 2D UV atlas 804. Each vertex $(v_n)$ in the mesh segment will be assigned with a 2D UV coordinates in the 2D UV atlas. Note that the vertices $(v_n)$ in a 2D chart form a connected component as their 3D counterpart. The geometry, attribute, and connectivity information of each vertex can be inherited from their 3D counterpart as well. For example, information may be indicated that vertex $v_4$ connects directly to vertices $v_0$, $v_5$, $v_1$, and $v_3$, and similarly information of each of the other vertices may also be likewise indicated. Further, such 2D texture mesh would, according to exemplary embodiments, further indicate information, such as color information, in a patch-by-patch basis such as by patches of each triangle, e.g., $v_2$, $v_5$, $v_3$ as one "patch".

Figure 8:
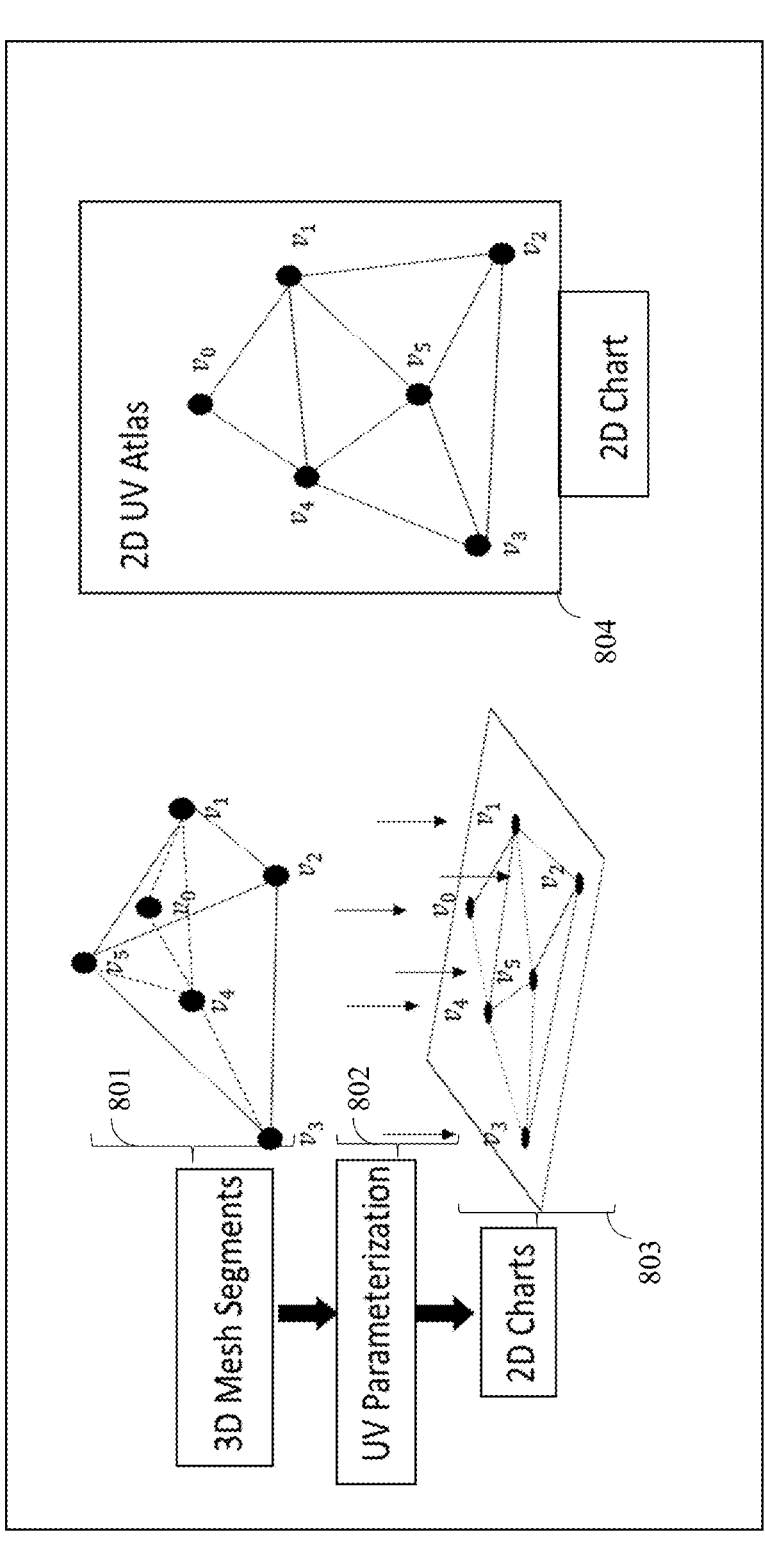
FIG. 8 is a simplified illustration in accordance with embodiments.
Figure 9:
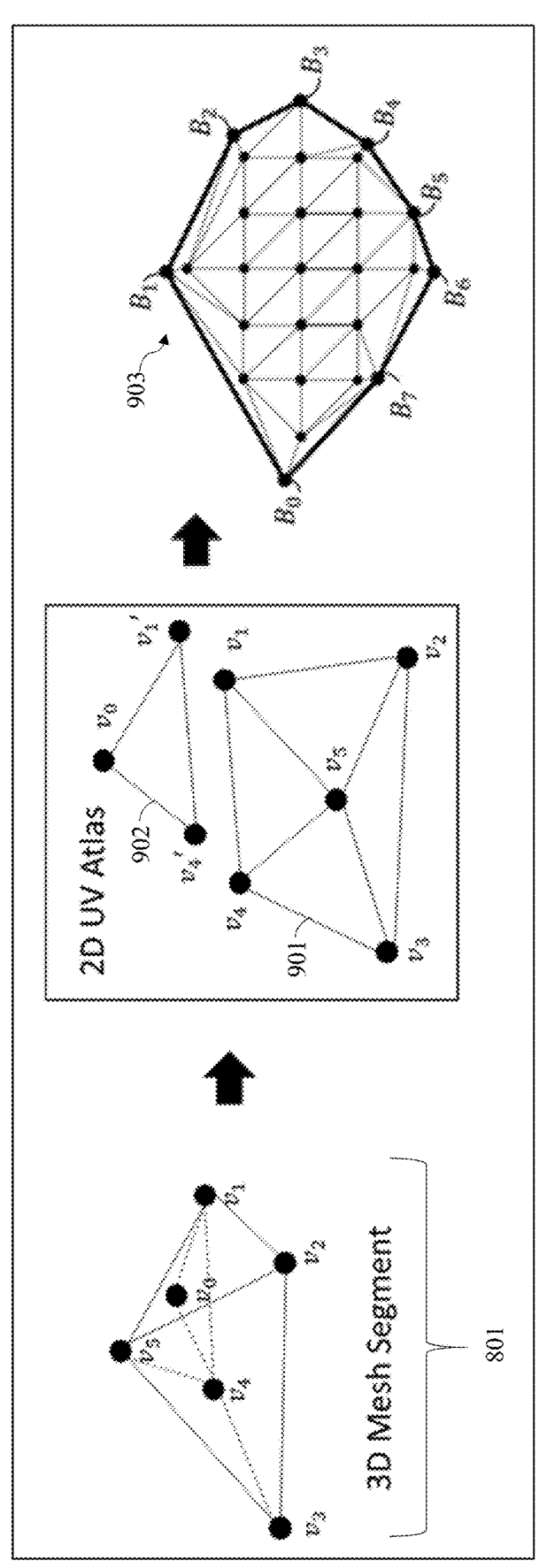
FIG. 9 is a simplified illustration in accordance with embodiments.
Figure 14:
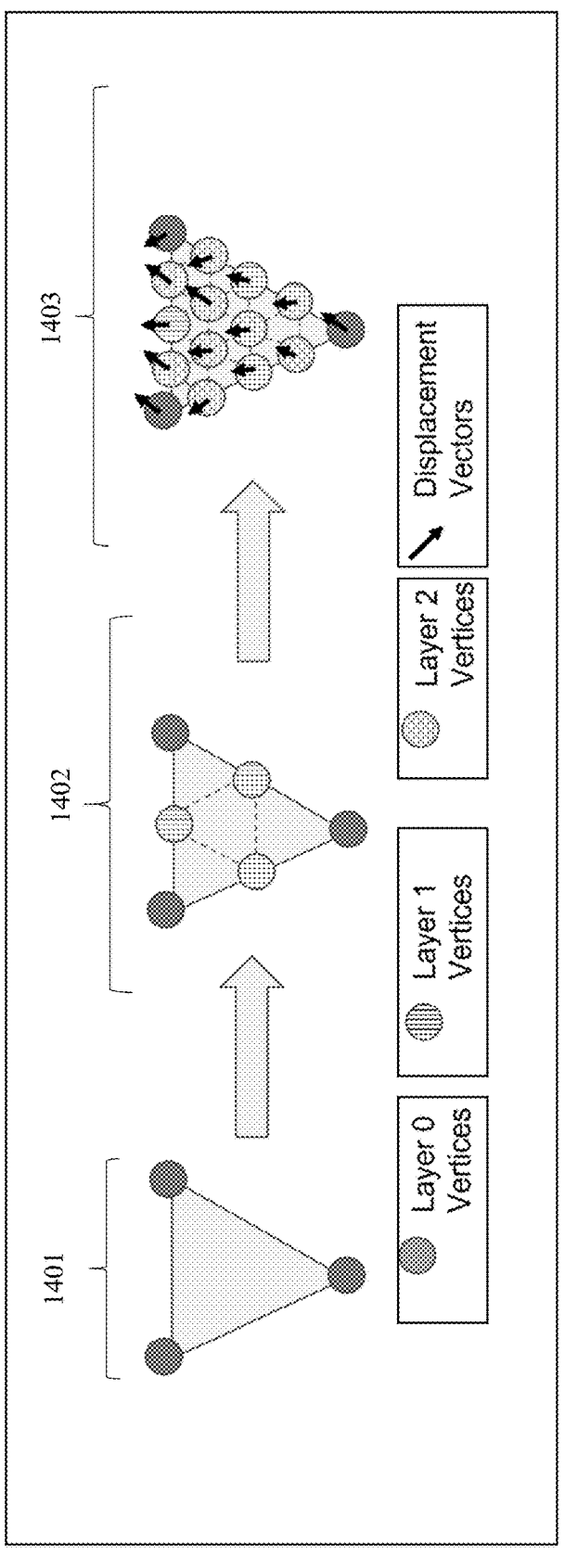
FIG. 14 is a simplified illustration in accordance with embodiments.

For example, further to the features of the example 800 of FIG. 8, see the example 900 of FIG. 9 where the 3D mesh segment 801 can be also mapped to multiple separate 2D charts 901 and 902. In this case, a vertex in 3D could corresponds to multiple vertices in 2D UV atlas. As shown in FIG. 9, the same 3D mesh segment is mapped to multiple 2D charts, instead of a single chart as in FIG. 8, in the 2D UV atlas. For example, 3D vertices $v_1$ and $v_4$ each have two 2D correspondences $v_1$, $v'_1$, and $v_4$, $v_4$, respectively. As such, a general 2D UV atlas of a 3D mesh may consist of multiple charts as shown in FIG. 14, where each chart may contain multiple (usually more than or equal to 3) vertices associated with their 3D geometry, attribute, and connectivity information.

FIG. 9 shows an example 903 illustrating a derived triangulation in a chart with boundary vertices $B_0$, $B_1$, $B_2$, $B_3$, $B_4$, $B_5$, $B_6$, $B_7$. When presented with such information, any triangulation method can be applied to create connectivity among the vertices (including boundary vertices and sampled vertices). For example, for each vertex, find the closest two vertices. Or for all vertices, continuously generate triangles until a minimum number of triangles is achieved after a set number of tries. As shown in the example 903, there are various regularly shaped, repeating triangles and various oddly shaped triangles, generally closest to the boundary vertices, having their own unique dimensions that may or may not be shared with any other of the triangles. The connectivity information can be also reconstructed by explicit signaling. If a polygon cannot be recovered by implicit rules, the encoder can signal the connectivity information in the bitstream according to exemplary embodiments.

Boundary vertices $B_0$, $B_1$, $B_2$, $B_3$, $B_4$, $B_5$, $B_6$, $B_7$ are defined in the 2D UV space. A boundary edge can be determined by checking if the edge is only appeared in one triangle. The following information of boundary vertices is significant and should be signaled in the bitstream according to exemplary embodiments: geometry information, e.g., the 3D XYZ coordinates even though currently in the 2D UV parametric form, and the 2D UV coordinates.

For a case in which a boundary vertex in 3D corresponds to multiple vertices in 2D UV atlas, such as shown in FIG. 9, the mapping from 3D XUZ to 2D UV can be one-to-multiple. Therefore, a UV-to-XYZ (or referred to as UV2XYZ) index can be signaled to indicate the mapping function. UV2XYZ may be a 1D-array of indices that correspond each 2D UV vertex to a 3D XYZ vertex.

According to exemplary embodiments, to represent a mesh signal efficiently, a subset of the mesh vertices may be coded first, together with the connectivity information among them. In the original mesh, the connection among these vertices may not exist as they are subsampled from the original mesh. There are different ways to signal the connectivity information among the vertices, and such subset is therefore referred to as the base mesh or as base vertices.

According to exemplary embodiments, a number of methods are implemented for dynamic mesh compression and are part of the above-mentioned edge-based vertex prediction framework, where a base mesh is coded first and then more additional vertices are predicted based on the connectivity information from the edges of the base mesh. Note that they can be applied individually or by any form of combinations.

Figure 10:
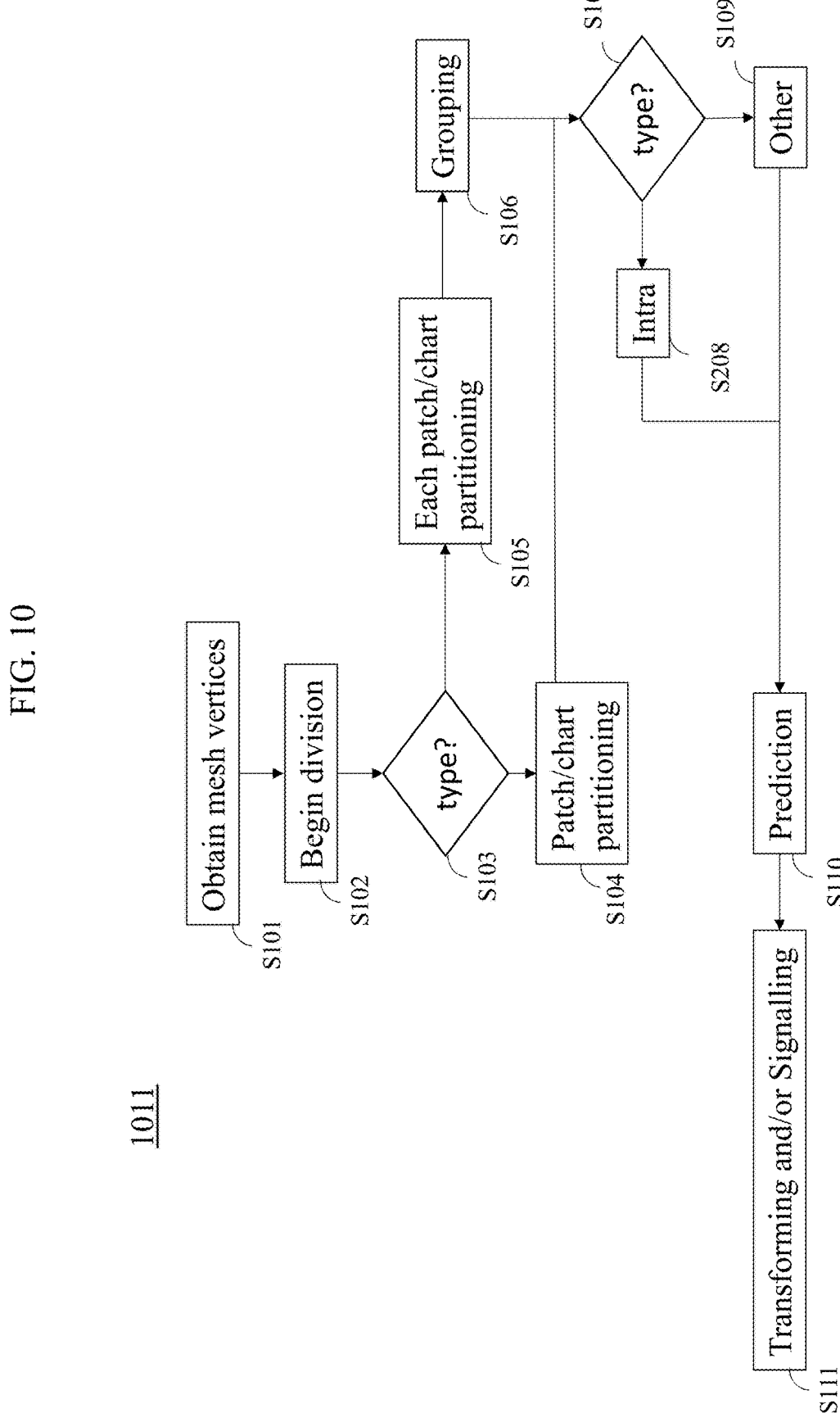
FIG. 10 is a simplified flow diagram in accordance with embodiments.

For example, consider the vertex grouping for prediction mode example flowchart 1001 of FIG. 10. At S101, vertices inside a mesh may be obtained and can be divided at S102 into different groups for prediction purposes, for example see FIG. 9. In one example, the division is done using the patch/chart partitioning at S104. In another example, the division is done under each patch/chart S105. The decision S103 whether to proceed to S104 or S105 may be signaled by a flag or the like. In the case of S105, several vertices of the same patch/chart form a prediction group and will share the same prediction mode, while several other vertices of the same patch/chart can use another prediction mode. Herein, a "prediction mode" may be considered to be a specific mode that a decoder uses to make a prediction for a video content including the patch, the prediction mode can categorically be divided into intra prediction modes and inter prediction modes, and within each category, there can be different specific modes that the decoder chooses from. According to exemplary embodiments, each group, a "prediction group" may share a same specific mode (e.g., an angular mode at a specific angle) or a same categorical prediction mode (e.g., all intra prediction mode but can be predicted at different angles) according to exemplary embodiments. Such grouping at S106 can be assigned at different levels by determining respective number of vertices involved per group. For example, every 64, 32 or 16 vertices following a scan order inside a patch/chart will be assigned the same prediction mode according to exemplary embodiments and other vertices may be differently assigned. For each group, a prediction mode can be intra prediction mode or inter prediction mode. This can be signaled or assigned. According to the example flowchart 1000, if a mesh frame or mesh slice is determined to be in intra type at S107, such as by checking whether a flag of that mesh frame or mesh slice indicates an intra type, then all groups of vertices inside that mesh frame or mesh slice shall use intra prediction mode; otherwise, at S108 either intra prediction or inter prediction mode may be chosen per group for all vertices therein.

Further, for a group of mesh vertices using intra prediction mode, its vertices can only be predicted by using previously coded vertices inside the same sub-partition of the current mesh. Sometimes the sub-partition can be the current mesh itself according to exemplary embodiments, and for a group of mesh vertices using inter prediction mode, its vertices can only be predicted by using previously coded vertices from another mesh frame according to exemplary embodiments. Each of the above-noted information may be determined and signaled by a flag or the like. Said prediction features may occur at S110 and results of said prediction and signaling may occur at S111

According to exemplary embodiments, for each vertex in a group of vertices in the example flowchart 1000 and in the flowchart 1100 described below, after prediction, the residue will be a 3D displacement vector, indicating the shift from the current vertex to its predictor. The residues of a group of vertices need to be further compressed. In one example, transformation at S111, along with the signaling thereof, can be applied to the residues of a vertex group, before entropy coding. The following methods may be implemented to handle the coding of a group of displacement vectors. For example, in one method, to properly signal the case where a group of displacement vectors, some displacement vectors, or its components have only zero values. In another embodiment, a flag is signaled for each displacement vectors whether this vector has any non-zero component, and if no, the coding of all components for this displacement vector can be skipped. Further, in another embodiment, a flag is signaled for each group of displacement vectors whether this group has any non-zero vectors, and if no, the coding of all displacement vectors of this group can be skipped. Further, in another embodiment, a flag is signaled for each component of a group of displacement vectors whether this component of the group has any non-zero vectors, and if no, the coding of this component of all displacement vectors s of this group can be skipped. Further, in another embodiment, there may be a signaling of the case where a group of displacement vectors, or a component of the group of displacement vectors, needs a transformation, and if not, the transformation can be skipped, and quantization/entropy coding can be directly applied to the group or the group components. Further, in another embodiment, a flag may be signaled for each group of displacement vectors whether this group needs to go through transformation, and if no, the transform coding of all displacement vectors of this group can be skipped. Further, in another embodiment, a flag is signaled for each component of a group of displacement vectors whether this component of the group needs to go through transformation, and if no, the transform coding of this component of all displacement vectors of this group can be skipped. The above-described embodiments in this paragraph, which regard handling of vertex prediction residues, may also be combined and implemented in parallel on different patches respectively.

Figure 11:
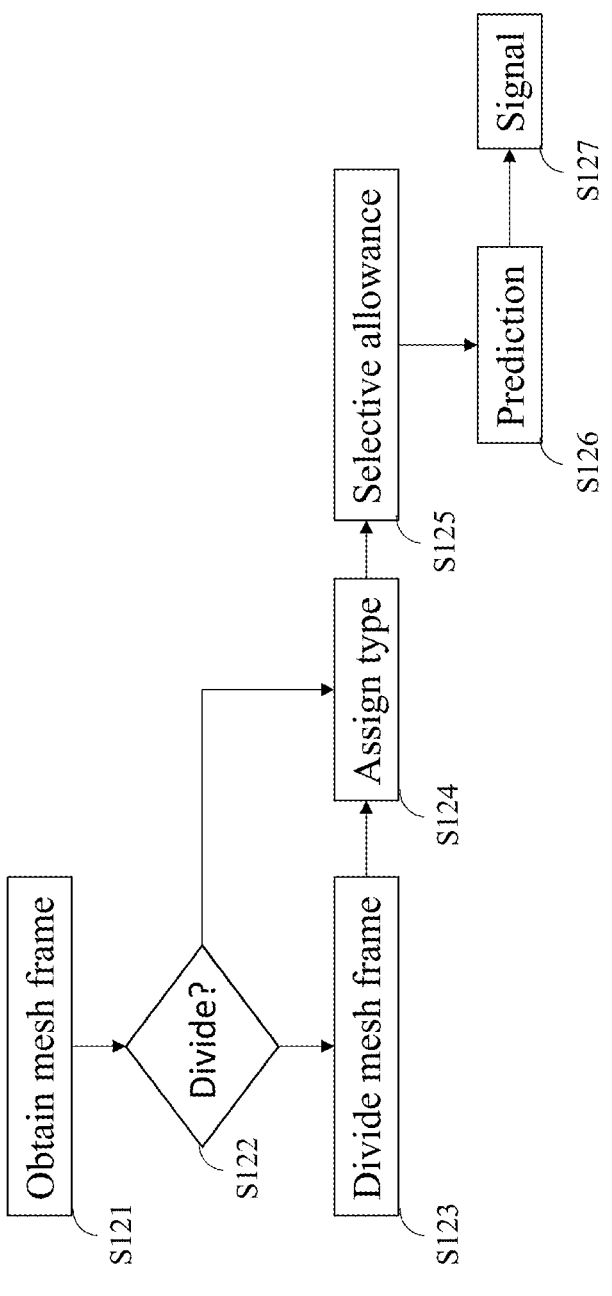
FIG. 11 is a simplified flow diagram in accordance with embodiments.

FIG. 11 shows the example flowchart 1150 where, at S121 a mesh frame can be obtained coded as an entire data unit, meaning all vertices or attributes of the mesh frame may have correlation among them. Alternatively, depending on a determination at S122, a mesh frame can be divided at S123 into smaller independent sub-partitions, similar in concept to slices or tiles in 2D videos or images. A coded mesh frame or a coded mesh sub-partition can be assigned with a prediction type at S124. Possible prediction types include intra coded type and inter coded type. For intra coded type, only predictions from the reconstructed parts of the same frame or slice are allowed at S125. On the other hand, an inter prediction type will allow at S125 predictions from a previously coded mesh frame, in addition to intra mesh frame predictions. Further, inter prediction type may be classified with more sub-types such as P type or B type. In P type, only one predictor can be used for prediction purposes, while in B type, two predictors, from two previously coded mesh frames, may be used to generate the predictor. Weighted average of the two predictors can be one example. When the mesh frame is coded as a whole, the frame can be regarded as an intra or inter coded mesh frame. In case of inter mesh frame, P or B type may be further identified via signaling. Or, if a mesh frame is coded with further splitting inside a frame, assign prediction type for each of the sub-partitions occurs at S124. Each of the above-noted information may be determined and signaled by a flag or the like, and like with S110 and S111 of FIG. 10, said prediction features may occur at S126 and results of said prediction and signaling may occur at S127.

Figure 21:
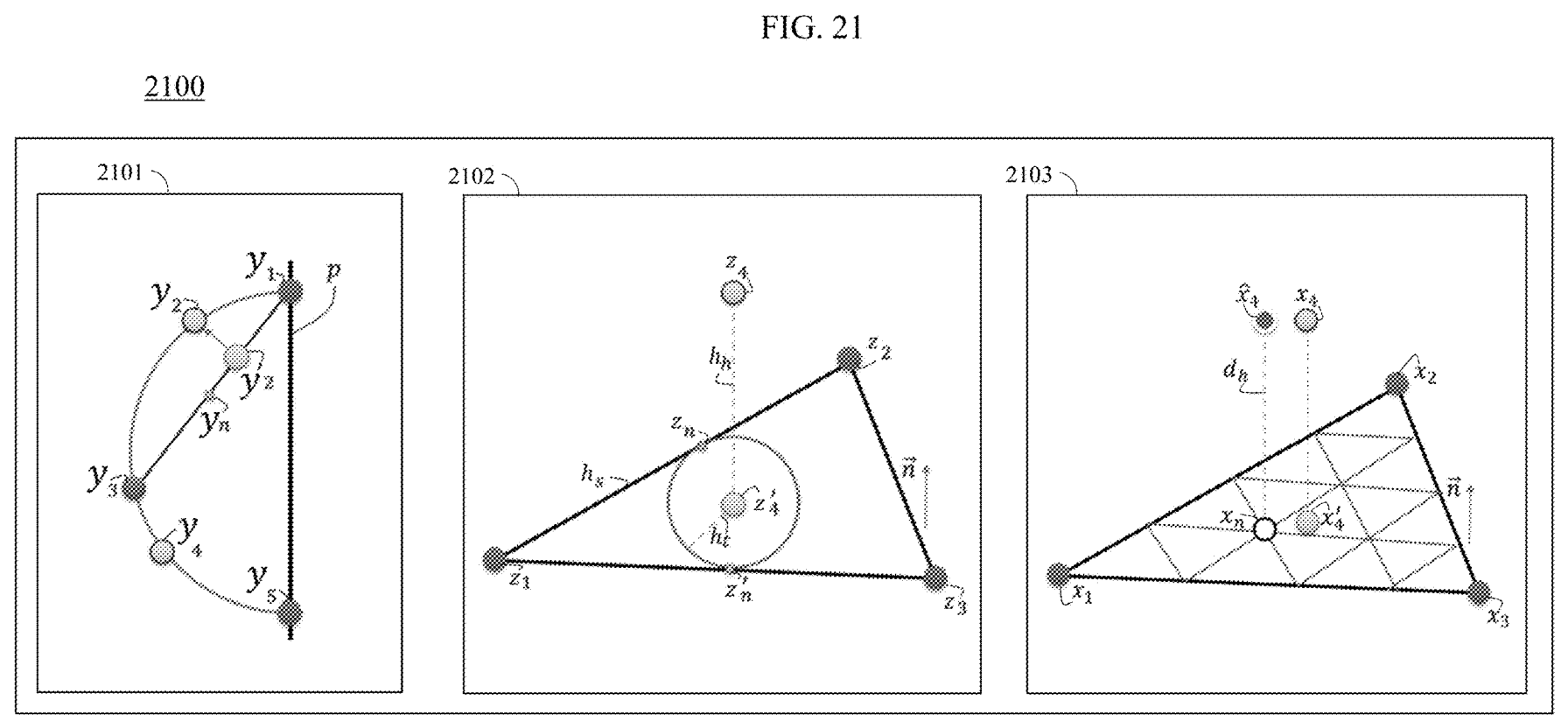

As such, although dynamic mesh sequence may require a large amount of data since it may consist of a significant amount of information changing over time, efficient compression technologies are required to store and transmit such contents, and the above described features for FIGS. 20 and 21 represent such improved efficiencies by allowing at least for improved mesh vertex 3D location prediction by either using previously decoded vertices in the same mesh frame (intra prediction) or from a previous coded mesh frame (inter prediction).

Figure 13:
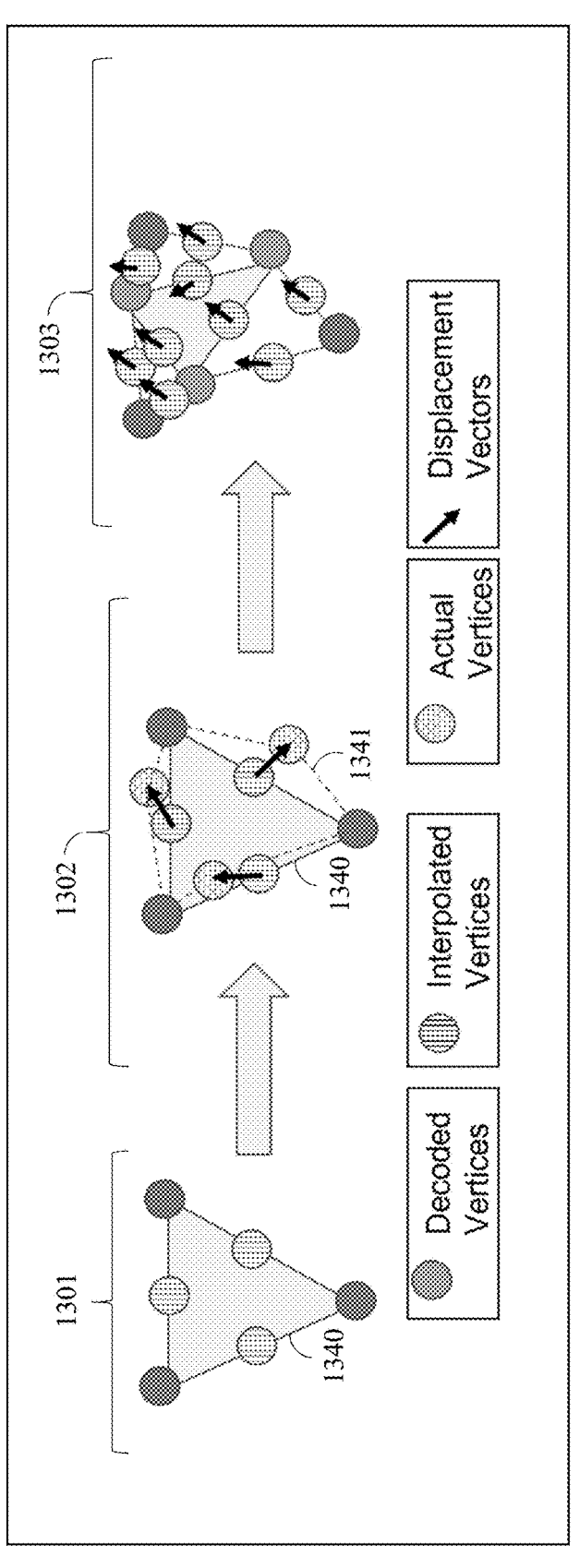
FIG. 13 is a simplified illustration in accordance with embodiments.

Further, exemplary embodiments may generate the displacement vectors of a third layer 1303 of a mesh, based on one or more the reconstructed vertices of its previous layer(s) such as a second layer 1302 and a first layer 1301. Assuming the index of the second layer 1302 is T, the predictors for vertices in third layer 1303 T+1 are generated based on the reconstructed vertices of at least the current layer or second layer 1302. An example of such layer based prediction structure is shown example 1300 in FIG. 13 which illustrates reconstruction based vertex prediction: progressive vertex prediction using edge-based interpolation, where predictors are generated based on previously decoded vertices, not predictor vertices. The first layer 1301 may be a mesh bounded by a first polygon 1340 having, as vertices thereof, decoded vertices, at boundaries thereof, and interpolated vertices, along ones of lines between ones of those decoded vertices. As the progressive coding proceeds from the first layer 1301 to the second layer 1302, an additional polygon 1341 may be formed by displacement vectors from ones of the interpolated vertices of the first layer to additional vertices of the second layer 1302, and as such, a total number of vertices of the second layer 1302 may be greater than that of the first layer 1301. Likewise, proceeding to the third layer 1303, the additional vertices of the second layer 1302, along with the decoded vertices from the first layer 1301, may then serve in the coding in a similar manner as did the decoded vertices served in proceeding from the first layer 1301 to the second layer 1303; that is, multiple additional polygons may be formed. As note, see the example 1400 in FIG. 14 illustrating such progressive coding where, unlike in FIG. 13, the example 1400 illustrates that, in proceeding from the first layer 1401 to the second layer 1403 and then to the third layer 1403, each of the additionally formed polygons may be entirely within a polygon formed by bounds of the first layer 1401.

Figure 12:
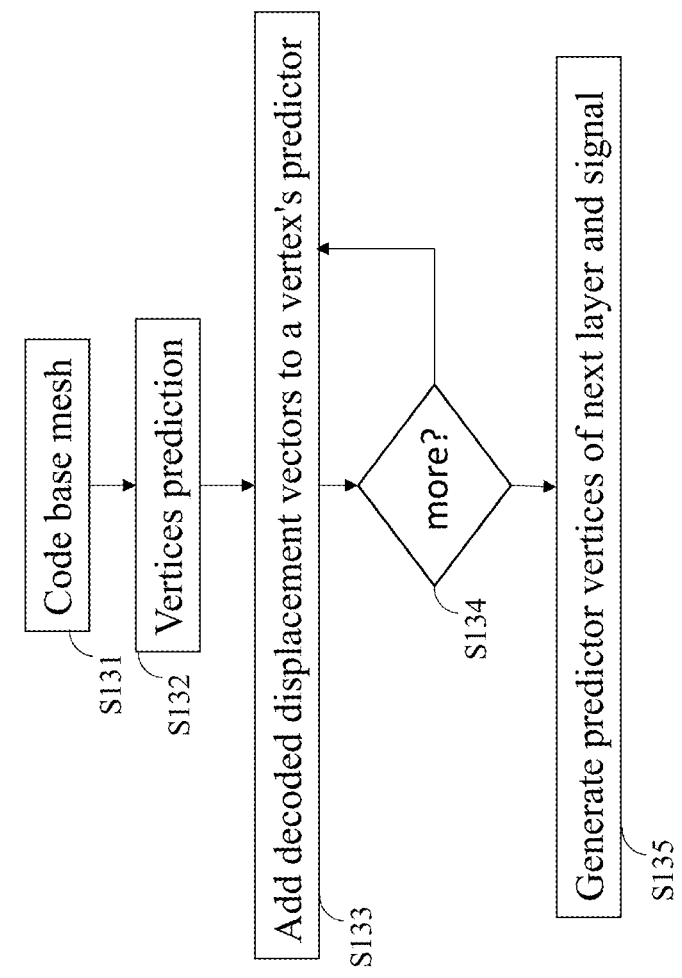
FIG. 12 is a simplified flow diagram in accordance with embodiments.

For such example 1300 and/or 1400, see, according to exemplary embodiments the example flowchart 1200 of FIG. 12 where since the interpolated vertices on the current layer are predicted values, such values need to be reconstructed, before being used to generate predictors of vertices on the next layer. This is done by coding a base mesh at S131, implementing vertices prediction as such at S132, then at S133 adding the decoded displacement vectors of the current layer to the vertex's predictors, such as of layer 1302. Then the reconstructed vertices of this layer together with all decoded vertices of previous layer(s), such as checking for addition vertices values of such layers at S134, can be used to generate and signal the predictor vertices of next layer 1303 at S135. This process can also be summarized as follows: Let P[t](Vi) represent the predictor of vertex Vi on a layer t; let R[t](Vi) represent the reconstructed vertex $v_1$ on layer t; let D[t](Vi) represent the displacement vector of vertex Vi on layer t; let f(*) represent the predictor generator, which, in particular, can be the average of the two existing vertices. Then for each layer t, there is the following according to exemplary embodiments:

$$P[t](Vi) = f(R[s|s<t](Vj), R[m|m<t](Vk)), \text{ where}$$

Vj and Vk are reconstructed vertices of previous layers $$R[t](Vi) = P[t](Vi) + D[t](Vi) \qquad \text{Eq. (1)}$$

Then, for all vertices in one mesh frame, divide them into layer 0 (the base mesh), layer 1, layer 2, . . . . Etc. Then the reconstruction of vertices on one layer relies on the reconstruction of those on previous layer(s). In the above, each of P, R and D represents a 3D vector under the context of 3D mesh representation. D is the decoded displacement vector, and quantization may or may not apply to this vector.

According to exemplary embodiments, the vertex prediction using reconstructed vertices may only apply to certain layers. For example, layer 0 and layer 1. For other layers, the vertex prediction can still use neighboring predictor vertices without adding displacement vectors to them for reconstruction. So that these other layers can be processed at the same time without waiting one previous layer to reconstruct. According to exemplary embodiments, for each layer, whether to choose reconstruction based vertex prediction or predictor based vertex prediction, can be signaled, or the layer (and its subsequent layers) that does not use reconstruction based vertex prediction, can be signaled.

For the displacement vectors whose vertex predictors are generated by reconstructed vertices, quantization can be applied to them, without further performing transformation, such as wavelet transform, etc. For the displacement vectors whose vertex predictors are generated by other predictor vertices, transformation may be needed and quantization can be applied to the transform coefficients of those displacement vectors.

As such, since a dynamic mesh sequence may require a large amount of data since it may consist of a significant amount of information changing over time. Therefore, efficient compression technologies are required to store and transmit such contents. In the framework of interpolation-based vertex prediction method described above, one important procedure is to compress the displacement vectors, and this takes up a major part in the coded bitstream, and the focus of this disclosure, and the features this disclosure alleviate such problem by providing for such compression.

Further, similar to the other examples described above, even with those embodiments, a dynamic mesh sequence may nonetheless require a large amount of data since it may consist of a significant amount of information changing over time, and as such, efficient compression technologies are required to store and transmit such contents. In the framework of 2D atlas sampling based methods indicated above, an important advantage may be achieved by inferring the connectivity information from the sampled vertices plus boundary vertices on decoder side. This is a major part in decoding process, and a focus of further examples described below.

According to exemplary embodiments, the connectivity information of the base mesh can be inferred (derived) from the decoded boundary vertices and the sampled vertices for each chart on both encoder and decoder sides.

As similarly described above, any triangulation method can be applied to create connectivity among vertices (including boundary vertices and sampled vertices). According to exemplary embodiments, connectivity types can be signaled in high-level syntax, such as sequence header, slice header.

As mentioned above, connectivity information can be also reconstructed by explicitly signaling, such as for the irregularly shaped triangle meshes. That is, if it is determined that a polygon cannot be recovered by implicit rules, the encoder can signal the connectivity information in the bitstream. And according to exemplary embodiments, the overhead of such explicit signaling may be reduced depending on the boundaries of polygons.

According to embodiments, only the connectivity information between boundary vertices and sampled positions is determined to be signaled, while the connectivity information among the sampled positions themselves is inferred.

Also, in any of the embodiments, the connectivity information may be signaled by prediction, such that only the difference from the inferred connectivity (as prediction) from one mesh to another may be signaled in bitstream.

As a note, the orientation of inferred triangles (such as to be inferred in a clockwise manner or in a counterclockwise manner per triangle) can be either signaled for all charts in high-level syntax, such as sequence header, slice header, etc., or fixed (assumed) by encoder and decoder according to exemplary embodiments. The orientation of inferred triangles can be also signaled differently for each chart.

As a further note, any reconstructed mesh may have different connectivity from the original mesh. For example, the original mesh may be a triangle mesh, while the reconstructed mesh may be a polygonal mesh (e.g., quad mesh).

According to exemplary embodiments, the connectivity information of any base vertices may not be signaled and instead the edges among base vertices may be derived using the same algorithm at both encoder and decoder side. And according to exemplary embodiments, interpolation of predicted vertices for the additional mesh vertices may be based on the derived edges of the base mesh.

According to exemplary embodiments, a flag may be used to signal whether the connectivity information of the base vertices is to be signaled or derived, and such flag can be signaled at different level of the bitstream, such as at sequences level, frame level, etc.

According to exemplary embodiments, the edges among the base vertices are first derived using the same algorithm at both encoder and decoder side. Then compared with the original connectivity of the base mesh vertices, the difference between the derived edges and the actual edges will be signaled. Therefore, after decoding the difference, the original connectivity of the base vertices can be restored.

In one example, for a derived edge, if determined to be wrong when compared to the original edge, such information may signaled in the bitstream (by indicating the pair of vertices that form this edge); and for an original edge, if not derived, may be signaled in the bitstream (by indicating the pair of vertices that form this edge). Further, connectivity on boundary edges and vertex interpolation involving boundary edges may be done separately from the internal vertices and edges.

Accordingly, by exemplary embodiments described herein, the technical problems noted above may be advantageously improved upon by one or more of these technical solutions. For example, since a dynamic mesh sequence may require a large amount of data since it may consist of a significant amount of information changing over time, and therefore, the exemplary embodiments described herein represent at least efficient compression technologies to store and transmit such contents.

Figure 15:
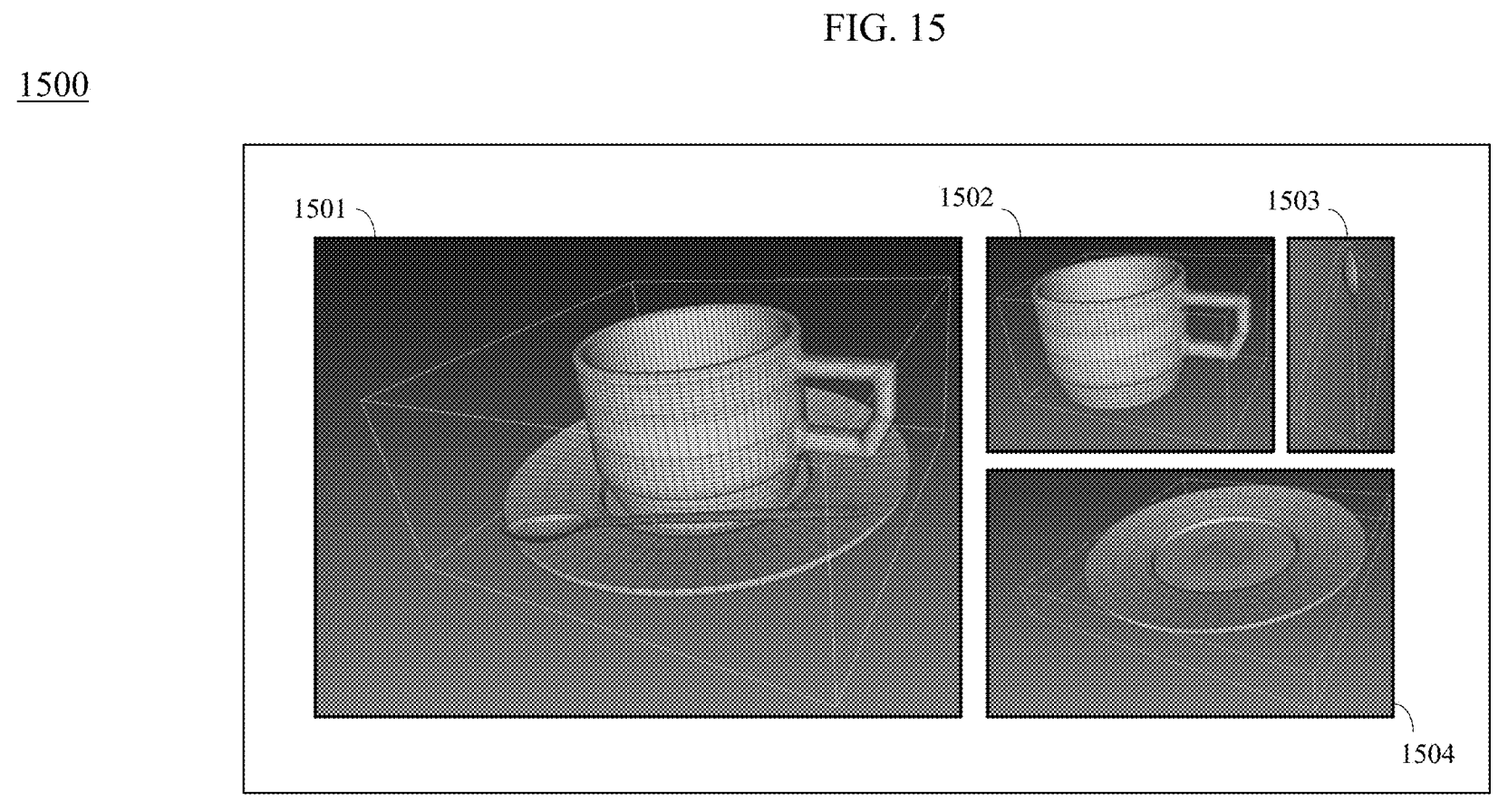

The above-described embodiments may be further applied to instance-based mesh coding, where an instance may be a mesh of an object or a part of an object. For example, the illustration example 1500 of FIG. 15 illustrates a mesh example 1501 in which various instances 1502 (representing a mesh of a cup), 1503 (representing a mesh of a spoon), and 1504 (representing a mesh of a plate) are present and may be separated and coded respectively. And each of the instances 1501, 1502, 1503, and 1504 are illustrated in respective ones of bounding boxes which will be described further below, but, as a note, it may be considered that the instance 1501 may be illustrated as a bounded by a "mesh-based bounding box" whereas each of instances 1502, 1503, and 1504 may be considered illustrated as bounding by respective ones of an "instance-based bounding box."

Figure 16:
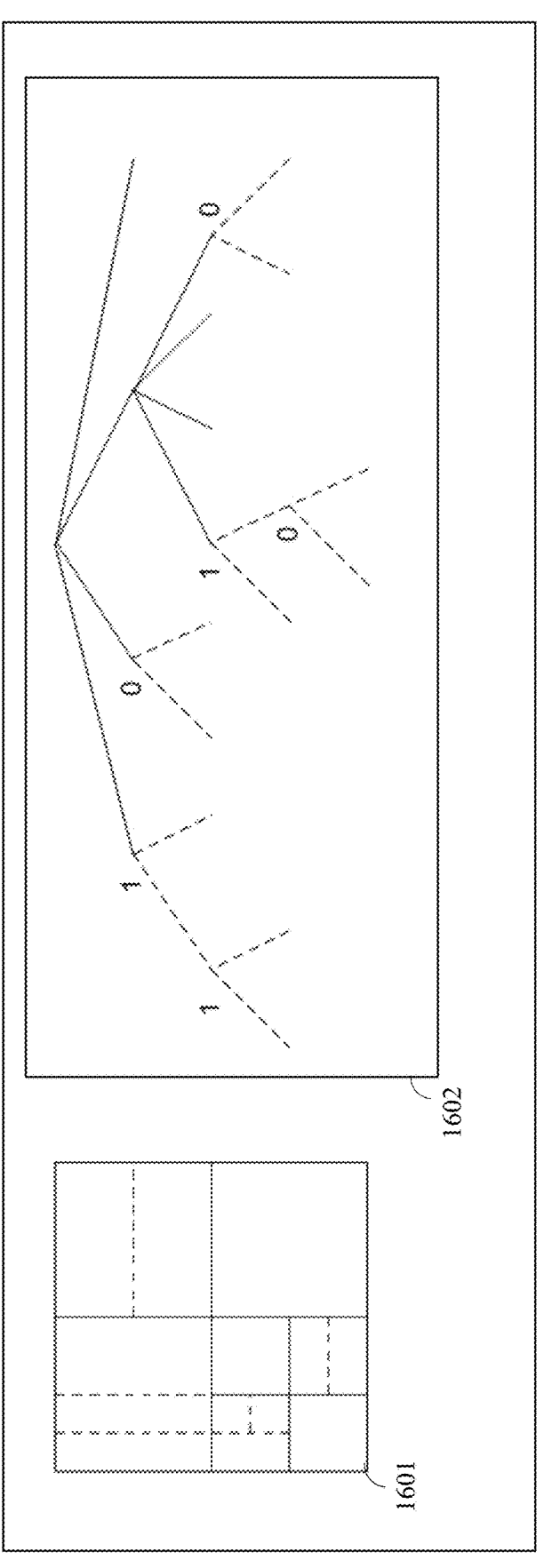
FIG. 16 is a simplified illustration in accordance with embodiments.

FIG. 16 illustrates an example 1600 of block partitioning by using quad tree binary tree (QTBT) 1601 and a corresponding tree representation 1602. The solid lines indicate quadtree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

A coding tree unit (CTU) is split into coding units (CUs) by using a quadtree structure denoted as coding tree to adapt to various local characteristics. The decision on whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure like the coding tree for the CU.

According to exemplary embodiments, there are both lossless and lossy mesh coding technologies. A base mesh may be extracted as subset of the original mesh, and remainder vertices are encoded based on distance-based predictive displacement coding.

Figure 17:
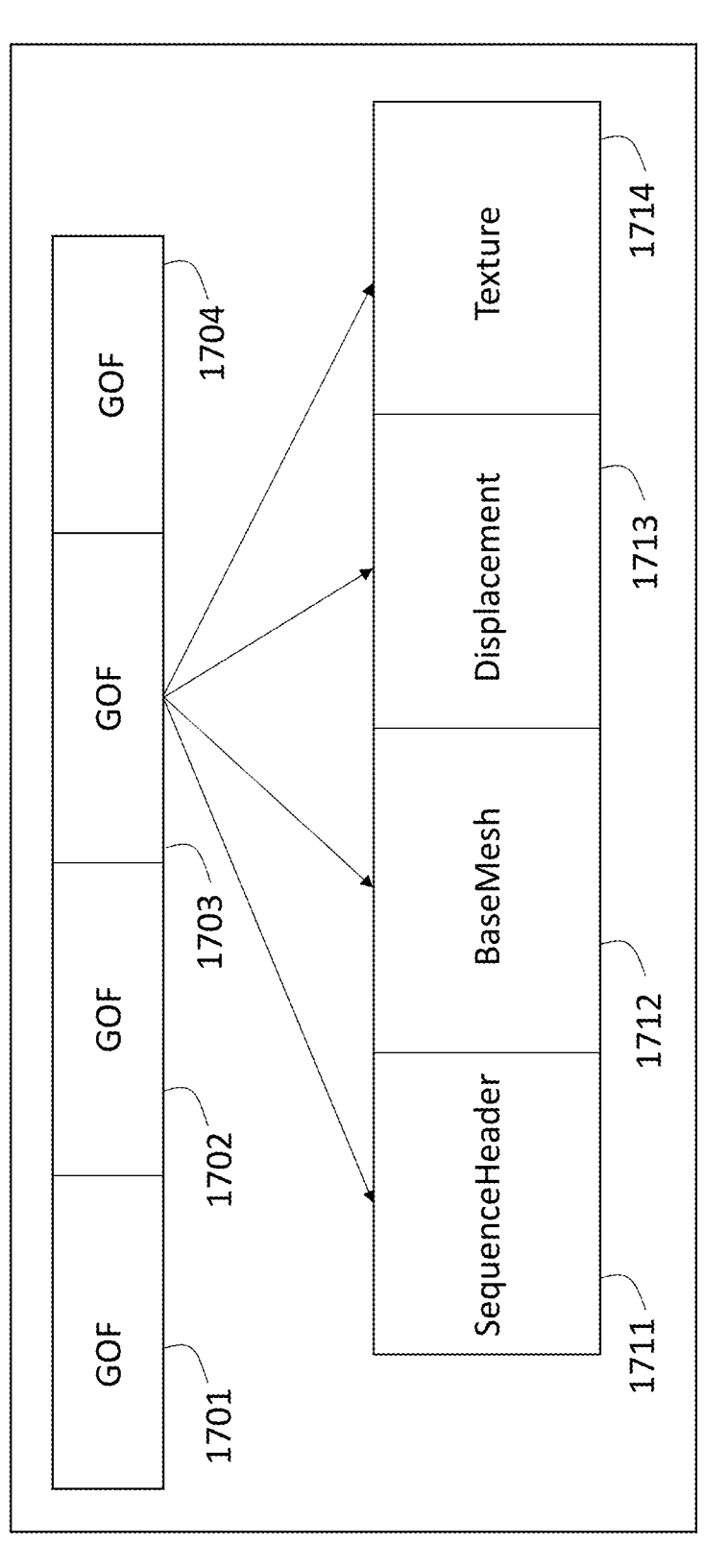
FIG. 17 is a simplified illustration in accordance with embodiments.

Also, according to exemplary embodiments, MPEG dynamic mesh compression test model V-DMC TMM v2.0, may include an encoded mesh bitstream as a concatenation of GoF (Group of Frames) bitstreams 1701, 1702, 1703, 1704, where each GoF bitstream includes or consists of a sequence header 1711, a base mesh bitstream 1712, a displacement bitstream 1713, and a texture bitstream 1714. An example 1700 is shown in FIG. 17.

However, when a displacement coding module is video codec based, the displacement bitstream may follow the corresponding video codec bitstream syntax, and when the displacement coding is non-video based, such as an arithmetic coding-based displacement coding, the bitstream syntax for displacement coding may have been unspecified and difficult to handle from the perspective of bitstream management. To solve those technical problems, embodiments herein provide a bitstream syntax for a generic codec in mesh displacement coding.

Figure 18:
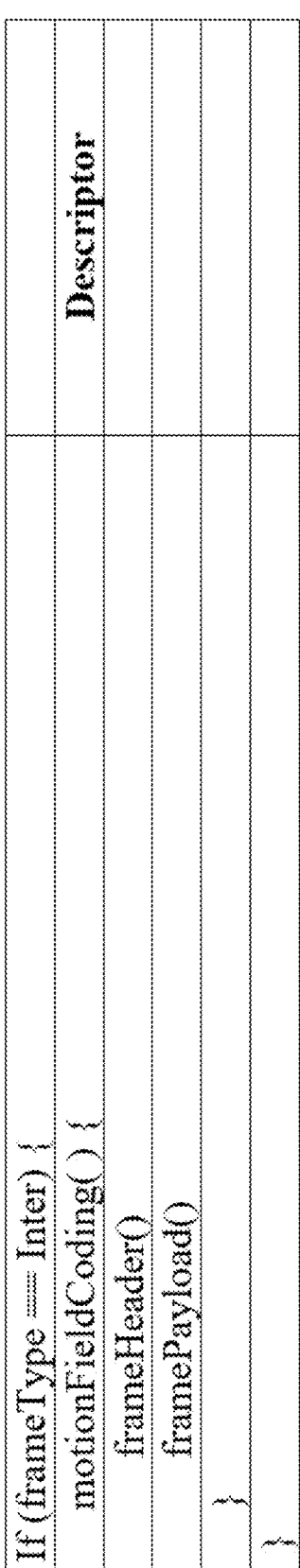
FIG. 18 is a simplified illustration in accordance with embodiments.

For example, there is provided according to embodiments herein a bitstream syntax for a generic codec in mesh displacement coding, and the displacement bitstream may be a concatenation of frame-level displacement bitstream, such as that of any of the GOF 1701, 1702, 1703, 1704, as shown in the example 1800 (a general syntax) of FIG. 18.

According to embodiments, these features specify the relationship between the network abstraction layer (NAL) unit stream and the NAL sample stream, either of which are referred to as the NAL bitstream.

The bitstream can be in one of two formats: the NAL unit stream format or the sample stream format. The NAL unit stream format is conceptually the more "basic" type. It consists of a sequence of syntax structures called NAL units. This sequence is ordered in decoding order. There may be constraints imposed on the decoding order (and contents) of the NAL units in the NAL unit stream.

The NAL sample stream format can be constructed from the NAL unit stream format by ordering the NAL units in decoding order and prefixing each NAL unit with a heading that specifies the exact size, in bytes, of the NAL unit. A sample stream header is included at the beginning of the sample stream bitstream that specifies the precision, in bytes, of the signalled NAL unit size. The NAL unit stream format can be extracted from the sample stream format by traversing through the sample stream format, reading the size information and appropriately extracting each NAL unit.

According to exemplary embodiments, for each frame of a group of frames, such as GOF 1703, its displacement bitstream 1713 consists of or includes at least a frame header, a frame payload, and an indication whether motion field coding is signaled as shown in example 1800 (a general syntax) of FIG. 18.

Mesh geometry information consists of vertex connectivity information, 3D coordinates, and 2D texture coordinates, etc. The compression of vertex 3D coordinates, which is also called vertex position, is very important, as in most cases, it takes up significant portion of the entire geometry related data.

For the base mesh bitstream, the base mesh may be coded using an intra mode or inter mode. The intra mode coding is realized by a static mesh codec, such as Draco. For the inter mode, a motion field is defined as the difference of vertex positions between the current frame and its reference frame. More precisely, for a vertex V in the current frame F, with a reference vertex V' in the reference frame F', the motion field for Vis $E=V-V'$ where the subtraction operation is the difference between position values of V and V'. The motion field may be coded by arithmetic coding, a video codec, or other codecs. In V-DMC TMM v2 0, the bitstream syntax for motion field coding is unspecified and difficult to handle from the perspective of bitstream management. In this disclosure, we present a bitstream syntax for mesh motion field coding.

other v3c unites, the unit type, and its associated $v_3c$ parameter set id and atlas id are signaled such as in the v3c_unit_header( ). An example is shown below according to exemplary embodiments:

```
v3c_unit_header( ) {
        vuh_unit_type              //descriptor u(5)
        if( vuh_unit_type == V3C_AVD || vuh_unit_type == V3C_GVD ||
vuh_unit_type == V3C_OVD || vuh_unit_type == V3C_AD ||
vuh_unit_type == V3C_MD) {
                vuh_v3c_parameter_set_id //descriptor u(4)
                vuh_atlas_id //descriptor u(6)
        }
        ...
        else
                vuh_reserved_zero_27bits   //descriptor u(27)
}
        v3c_unit_payload( numBytesInV3CPayload ) {
                if (vuh_unit_type == V3C_VPS )
                        v3c_parameter_set( numBytesInV3CPayload )
                else if( vuh_unit_type == V3C_AD)
                        atlas_sub_bitstream( numBytesInV3CPayload )
                else if( vuh_unit_type == V3C_MD)
                        mesh_sub_bitstream( numBytesInV3CPayload)
                else if( vuh_unit_type == V3C_OVD || vuh_unit_type == V3C_GVD ||
vuh_unit_type == V3C_AVD)
        Further, according to exemplary embodiments, a basemesh submesh layer raw byte
sequence payload (RBSP) syntax may include:
        bmesh_submesh_layer_rbsp( ){
                submesh_header( )
                submesh_data_unit( mfh_submesh_type, SubMeshUnitSize )
                rbsp_trailing_bits( )
        }
```

According to exemplary embodiments, there is a bitstream syntax for mesh motion field coding The motion field bitstream consists of a frame header and a frame payload, such as shown in example 1800 of FIG. 18.

In the frame header, such as in example 1900 of FIG. 19 (example header syntax), the frame index is represented by an X-bit integer (where in one example X=8), followed by the reference frame index, which is specified by a Y-bit integer (where in one example Y=8).

In the frame payload, such as shown in the example 2000 of FIG. 20 (example payload syntax), a Z-bit integer (where in one example Z=32) specifies the byte size of the coded bitstream, followed by the coded bitstream. The examples 1800, 1900, 2000, and 2100 show frame level displacement bitstream code according to example embodiments.

According to exemplary embodiments, aspects described herein may be used separately or combined in any order and may be used for arbitrary polygon meshes, and geometry may be encoded by a base-mesh and a predictive displacement coding. For example, given a base mesh which is a subset of an original mesh obtained, the original vertex may be encoded by its predicted point (projected vertex) and a displacement between the predicted point (projected vertex) and the original point (a remainder vertex). base mesh is constraints so that the remainder vertices (not included in the vertices) is always in the normal direction side of the in-between vertices.

Therefore, according to exemplary embodiments, there is provided a high level syntax for arithmetic coding of displacements. Such displacement bitstream is a concatenation of frame-level displacement bitstream, and for each frame, its displacement bitstream consists of a frame header and a frame payload.

According to an example embodiment, basemeshes may be signaled in a new substream, which may be named as the Basemesh data substream (unit type V3C_MD). As with Therefore, according to exemplary embodiments, there is provided a high level syntax for arithmetic coding of displacements. Such displacement bitstream is a concatenation of frame-level displacement bitstream, and for each frame, its displacement bitstream consists of a frame header and a frame payload.

Further, in a case where displacement coding for a 2D mesh is decided, then, viewing example 2101, of a two distances-based displacement coding for a 2D mesh, point $y'_2$ is a projection of point $y_2$ to line that connect its neighbor points $y_1$, $y_3$ and perpendicular to the plane p passing through points $y_1$, $y_2$, $y_3$. As point $y_2$ in the same side as normal vector of p plane. To encode point $y_2$ only projection $y_2$ with a scalar distance $d_r = \|y'_2 - y_2\|$ are necessary at S2005. Additionally, in this embodiment, $y'_2$ is constrained to line in between $y_1$ and $y_3$. Therefore, a scalar distance $d_s$ to the neighbor vertex $y_n$ is enough to restore $y'_2$. That is, in the example 2101, points $y_1$, $y_3$, $y_5$, may be base mesh vertices; points $y_2$, $y_4$ may be remainder vertices;

$$y'_2$$

may be a projected vertex, and point $y_n$ may be a derived neighbor.

According to exemplary embodiments in 2D, and also in 3D according to other exemplary embodiments additional points $y_n$ are derived from the neighbor, which is also on line between the neighbor points $y_1$, $y_2$. For example, the scalar distance from point $y_n$ is derived as 0, ½, ⅓, ⅔ from the middle of points $y_1$, $y_3$. And a best candidate in term of rate and distortion is selected and signaled.

Such embodiment represents an improvement since although points $y_1$, $y_3$ may be used to obtain the middle point $y_n$ and then to project therefrom to point $$y'_2,$$

a more accurate desired vertex may instead have been at point $y_2$, rather than point $$y'_2,$$

which may be advantageously obtained by exemplary embodiments described herein.

Viewing the example 2102, which shows two distances-based displacement coding for a 3D mesh, in FIG. 21, displacement coding for almost lossless, which may be considered lossless herein, 3D mesh is described according to exemplary embodiments based on a selection of 3D coding. For example, if it is determined that lossy coding is not selected, then vertex point $z_4$ is predicted from neighbouring vertices in base mesh: points $z_1$, $z_2$, $z_3$. Similar to the 2D case of example 2101, point $z_4$ can be predicted from point $$z'_4$$

if the distance $h_h$ is known. On the other hand, point $$z'_4$$

could be predicted either from point $z_n$ or point $$z'_n$$

(depending on the rate and distortion cost) with distance $h_r$ and $h_s$. Totally, to signal point $z_4$ three distances $h_s$, $h_r$, $h_h$ would be used with an index to indicate which edge is used for prediction. That is, points $z_1$, $z_2$, $z_3$ may be base mesh vertices; point $z_4$ may be a remainder vertex; point $$z'_4$$

may be a projected vertex; and point $z_n$ and point $$z'_n$$

may be derived neighbors.

Viewing the example 2103, which shows a subdivision and distance based mesh coding, such exemplary embodiments similarly introduce a displacement coding for lossy 3D mesh, as selected, based on distance and face subdivision. That is, like with example 2102, in example 2103 the projected vertex of point $x_4$ over base mesh face point $$x'_4$$

and the distance $d_n$ is enough to encode point $x_4$. In this embodiment, the face is subdivided first at level L. The closest subdivision point to point $$x'_4$$

(which is $x_n$ in this example) is selected. Then point $\hat{x}_4$ is derived from point $x_n$ at distance $d_n$ toward normal direction of the current triangle. Point $\hat{x}_4$ is considered as a lossy version of point $x_4$. Finally, the distance $d_n$, and index of point $x_n$ with subdivision at S2011 are encoded, and although triangle subdivision is illustrated in example 2103, other polygon shapes may be used as described herein. That is, points $x_1$, $x_2$, $x_3$ may be base mesh vertices; point $x_4$ may be a reminder vertex; point $$x'_4$$

may be a projected vertex; point $x_n$ may be a nearest sub-division; and point $\hat{x}_4$ is predicted vertex.

As described above for example 2101, example 2103 also represent additional advantageous improvements since, as compared to example 2102, example 2103 may simplify the computational complexity as compared to a situation where the value of ones of point $z_4$ and point $$z'_4$$

may not be integer values (point $z_4$ and point $$z'_4$$

correspond to point $x_4$ and point $$x'_4$$

respectively for the sake of this description). That is, by finding point $x_n$ as a closest point (among vertices of polygons regularly divided within the overall polygon formed by vertices $x_1$, $x_2$, $x_3$) to point $x_4$, that point $x_n$ may be more likely than point $$x'_4$$

to have an integer value, and thereby the point $\hat{x}_4$ as predicted vertex therefrom similarly may have an integer value and therefore reduced computational complexity as compared to point $x_4$ which may instead be less likely to have such integer value.

According to exemplary embodiments, at embodiment there is a face level handling for a lossy 3D quad mesh based on distance and face subdivision. For example, instead of predicting and encode sequentially there is a pixelizing of the mesh to corresponding a rectangular block, such as one or more of the blocks shown in example 1601. This approach enables block portioning, block merging framework in the video coding.

Figure 22:
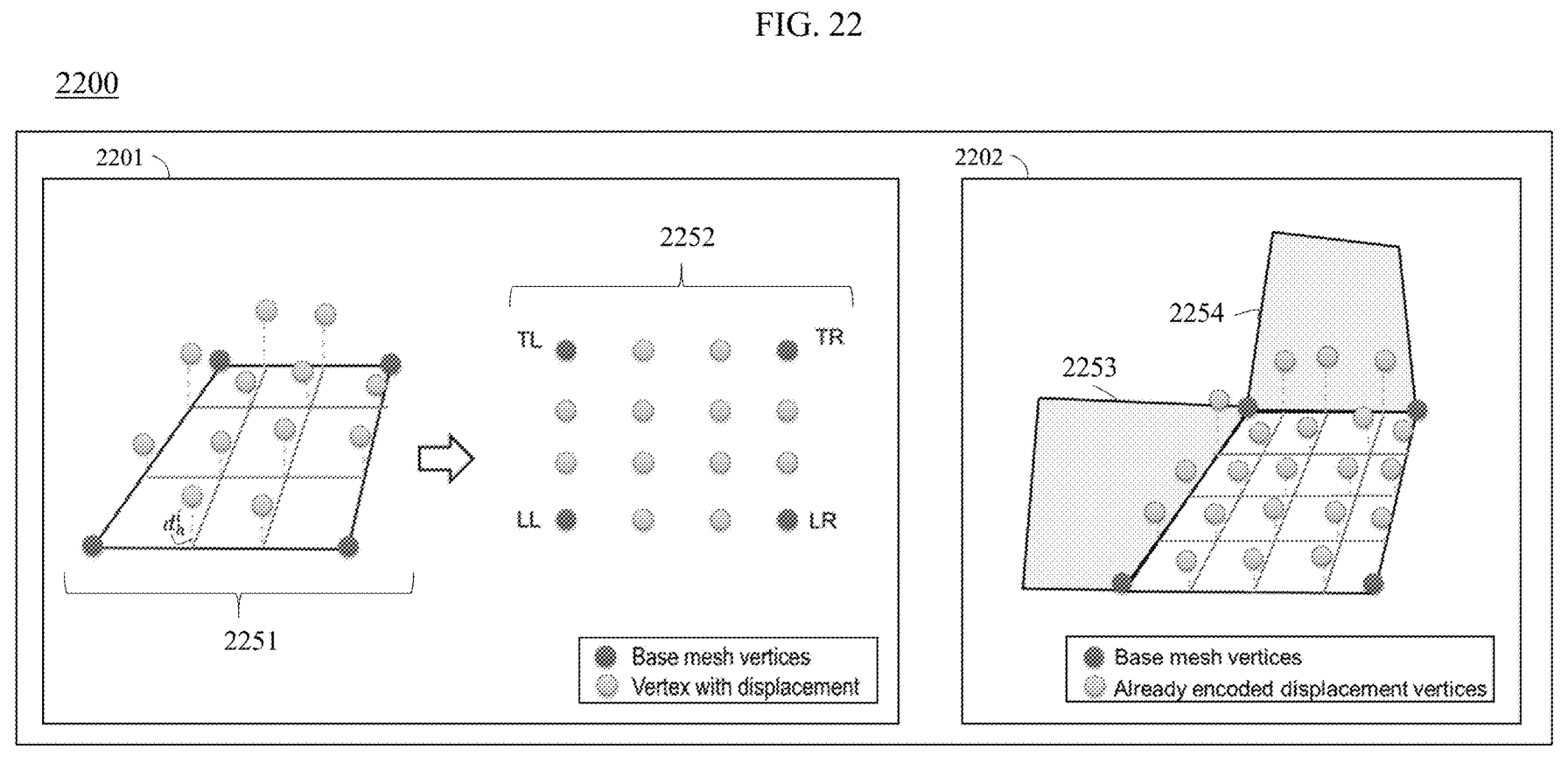

For example, for pixelizing a face, given a quad face, there by first be first subdivision them so that the subdivided and the original vertices account for $n^2$ points. A ternary tree example, shown in example 2201, of a ternary tree subdivision at level 1 for quad mesh and group representation of corresponding displacement, of example 2200 of FIG. 22, may used to divide a quad face to have $4^2$ faces. Based on the assumptions of smooth varying surface of the mesh, the group of displacement are likely to have high correlation. Therefore, intra-like prediction and local transform may be used to further compress the displacement $$d_h^i$$

prediction 2251. Such aspects may help to save bits rate while increasing the throughput for encoder and decoder.

According to exemplary embodiments, multi-level partitioning may occur such that adaptive subdivision is used to improve the coding efficiency of the displacement $$d_h^i.$$

That is, firstly, a quad mesh is ternary sub-division several times to have group displacement representation 2252 of size $B_1 \times B_2$, where $B_{1,2}$ is a multiple of 2. Subsequently, conventional video coding partitioning could be used. In one example, $B_1$, $B_2$ are set to 32. Alternatively, a different partitioning can be applied considering the orientation of the quad base mesh face. The longer orientation is subjected to partition at higher level. Such aspects, thereby, enable a non-square pixelized face, such as shown with the already encoded faces 2253 and 2254 examples. This will reduce distortion for non-square quad face when one direction is significantly larger than the other. Also, adaptive merging quad face features may be used such that there may be an individual quad face that is ternary sub-divided one time. Then two or four near by neighbor could be merged if their transform coded cost is determined to be smaller than individual cost.

For example, viewing the group displacement representation 2252, already encoded base mesh vertices may be used (Lower Left—LL, Lower Right LR, Top Left—TL, Top Right—TF) to predict the displacement depending on its position; that is given a group displacement representation of size $B_1 \times B_2$, four weight matrices may be used to derive the prediction at position i, j of the partition grid as $$pred_{i,j} = \frac{W_{LL}(i,j)v_{LL} + W_{LR}(i,j)v_{LR} + W_{TR}(i,j)v_{TR} + W_{TL}(i,j)v_{TL}}{W_{LL}(i,j) + W_{LR}(i,j) + W_{TL}(i,j) + W_{TR}(i,j)}, \quad \text{Eq. (1)}$$

where $v_x$ denote the vertices of base mesh at the X location (LL, LR, TL, TF), and weight matrices is always $W_x(i,j)$ positive number.

Further, example 2202 illustrates neighbor based intra displacement prediction where base mesh vertices and already encoded neighbor displacement vertices may be used to predict the current displacement group. Prediction thereof could be angular prediction in intra prediction.

Additional base mesh vertices may be utilized to perform correction for angular prediction as well as post smoothing with Eq. (1) according to exemplary embodiments.

As such, aspects described herein address technical deficiencies by avoiding creating additional vertices with fake connectivity which would reduce the throughput of GPU based mesh rendering and thereby be unable to utilize advance coding methods in video compression for mesh coding.

Figure 23:
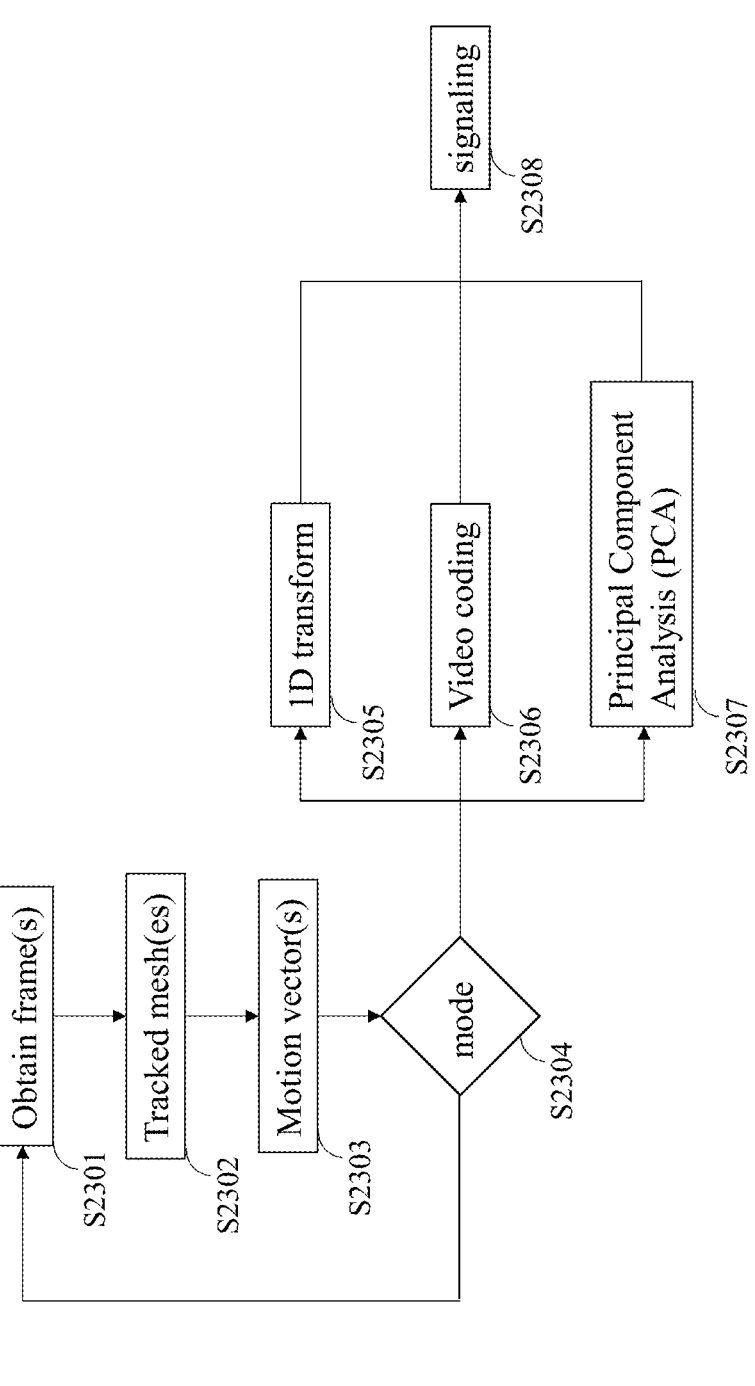
FIG. 23 is a simplified flow diagram in accordance with embodiments.

According to exemplary embodiments, further see example 2300 of FIG. 23 illustrating a flowchart in which, at S2301 one or more frames are obtained such that m(i) may be the i-th frame in a mesh sequence, v(i,j) may be the position of the j-th vertex of m(i) and $m(i_0), \ldots, m(in)$ may be tracked meshes, determined by signaling at S2302, where $m(i_0)$ may be the reference frame. The motion vector $f(i_k, j)$ of the j-th vertex of $m(i_k)$ is calculated at S2303 as $$f(i_k, j) = v(i_k, j) - v(i_0, j) \qquad \text{Eq. (12)}$$

Alternatively, the motion vector $f(i_k, j)$ of the j-th vertex of $m(i_k)$ can be calculated as $$f(i_k, j) = v(i_k, j) - v(i_{k-1}, j) \qquad \text{Eq. (13)}$$

$$\text{for}$$

$$k > 0$$

According to exemplary embodiments, the motion field of $m(i_k)$ consists of all motion vectors in the frame and will be denoted as $f(i_k)$, and embodiments herein regard compressing $f(i_k)$ for $k=1, \ldots, n$. Note $f(i_0)$ does not need to be coded as it contains all zeros by definition.

Depending on signaling, such as by a flag or operator direction, at S2304 a mode may be selected.

In a mesh sequence, exemplary embodiments herein refer to multiple mesh frames being tracked if all those meshes are determined, at S2302, to share the same one or more of any of number of vertices, connectivity, texture coordinates and texture connectivity and when only the positions of vertices differ among those meshes. Since there is one-to-one correspondence between the vertices of two tracked mesh frames, which may be referred to herein as the reference frame and the current frame, the vertex positions of the current frame can be predicted by the reference frame, and the prediction residuals form the motion field.

Further, it is to be understood that a "mesh" as described herein according to exemplary embodiments may be composed of several polygons that describe the surface of a volumetric object. Each polygon is defined by its vertices in 3D space and the information of how the vertices are connected, referred to as connectivity information. Optionally, vertex attributes, such as colors, normals, displacements, etc., could be associated with the mesh vertices. Attributes could also be associated with the surface of the mesh by exploiting mapping information that parameterizes the mesh with 2D attribute maps. Such mapping is usually described by a set of parametric coordinates, referred to as UV coordinates or texture coordinates, associated with the mesh vertices. 2D attribute maps are used to store high resolution attribute information such as texture, normals, displacements, etc. Such information is used for various purposes herein such as texture mapping, shading and mesh reconstruction etc.

At S2305, a 1D transform, such as discrete cosine transform (DCT) or lifting wavelet transform, may be applied on each vertex's trajectory. For example, see the displacement vectors shown in FIGS. 12, 13, 21, and 22 any of which could be involved as the vertex's trajectory described herein at any of S2305, S2306 and S2307. Specifically, at S2305, for the j-th vertex, a 1D transform can be applied to each spatial dimension of $f(i_k, j)$, where $k=1, \ldots, n$. The resulting transform coefficients can then be encoded by using entropy/arithmetic coding, video coding etc. On the decoder side, an inverse transform to reconstruct the motion fields may be run.

At S2306, the motion fields can be directly encoded by video coding. The examples 2201 and 2202 show examples of motion fields according to exemplary embodiments which are not limited to those exact examples. For each frame, such as a patch described above or a group of patches, all the motion vectors $f(i_k, j)$ in the mesh frame may be grouped according to a certain order, such as the order of vertex indices listed in the encoding/decoding order, or the order of a mesh traversal algorithm, such as Edgebreaker algorithm, and then there may be a packing of the ordered motion vectors into a 3-channel image, where each channel corresponds to one spatial dimension of the motion vectors. The packing can be done in any order, such as raster order, Morton order etc. After packing, the images from all frames can be encoded by a video codec. And decoding may be performed accordingly. After decoding the video frame, an unpacking operation can be applied to convert the 2D array of motion vectors back to the array of mesh vertices with a known order, which is used in the encoder side according to exemplary embodiments.

However, herein, embodiments herein use arithmetic coding to compress displacement coefficients, which will avoid or alleviate the shortcomings of applying video coding mentioned above.

For example, for arithmetic coding of displacements, embodiments first, for each frame, determine to encode the displacement coefficients or the prediction residues of displacement coefficients according to the frame type; if the frame type is intra, embodiments encode the displacement coefficients of the current frame; otherwise, embodiments first predict the displacement coefficient of each vertex of the current frame by using the coefficient of the corresponding vertex in the previous frame, then encode the prediction residues of the displacement coefficients. As such, embodiments herein use arithmetic coding to compress the displacement coefficient, and it is reported that the suggested method achieves higher coding efficiency and lower coding complexity than video coding at the same time. Also, due to the lossless nature of arithmetic coding, the step of reconstructing displacements from video frames for texture transfer on the encoder side can be avoided, which further reduces the encoding runtime.

At S2307, there may be an encoding of motion fields by using principal component analysis (PCA), which may change coordinates, the motion fields may each include displacement vector and motion vector information for multiple or all of vertices of a patch or group of patches described herein. First, there may be a constructing of a data matrix M for the motion fields. The j-th row of M is $f(i_k, j)$, $k=1, \ldots, n$, after flattening the 3 spatial dimensions, so the length of each row, i.e. the number of columns is 3n, and the number of rows r equals the number of vertices in each mesh, thus the size of M is r×3n. Note flattening the 3 spatial dimensions can be done in the order of $x_1 y_1 z_1 \ldots x_n y_n z_n$ or $x_1 \ldots x_n y_1 \ldots y_n z_1 \ldots z_n$. After constructing the data matrix M, there may be a centering of column thereof by subtracting its mean, and then the covariance matrix $C=M^T M$ can be computed, and subsequently the principal components can be obtained by eigendecomposition of C, which has a low computational complexity as the size of the covariance matrix C is 3n×3n. After eigendecomposition of C, there may be either signaling of all eigenvectors or only signaling of a first plurality, at least two, of eigenvectors according to a configurable threshold of the eigenvalues. Additionally, a projection may be signaled of each row of M on the signaled eigenvectors and signal the coefficients of with respect to those eigenvectors. The mean of each column of M should be signaled as well according to exemplary embodiments. All signaling can be done with entropy coding, such as arithmetic coding, according to exemplary embodiments. On the decoder side, the centered trajectory for each vertex can be recovered by linear combination of the decoded the eigenvectors with the corresponding decoded coefficients, and then the original trajectory of each vertex can be obtained by the summation of the centered trajectory and the decoded mean positions.

According to exemplary embodiments, when it is determined that there exists other data that are encoded via video coding, exemplary embodiments concatenate those data with motion vectors and pack them into a single video for coding. For example, for a mesh frame that has both motion vectors and displacement vectors, the motion vectors and displacement vectors can be packed into the same video frame for further coding. In particular, displacement information can be put behind all the motion vectors. This includes the possibility that the motion vectors and displacement vectors are included in different streams or are included in a same stream, and similarly may be coded by a single video codec.

As such, although a dynamic mesh sequence may require a large amount of data since it may consist of a significant amount of information changing over time, when a mesh sequence consists of tracked meshes, which contain a large amount of redundant information, there is a great room to compress the meshes significantly by embodiments described herein which regard compression of a motion field of dynamically subdivided meshes. As such, by exemplary embodiments herein, a number of methods are described to improve approaches to compression of motion field of dynamic subdivide meshes, and those methods described herein are applied individually or by any form of combinations.

According to exemplary embodiments, the proposed methods may be used separately or combined in any order. The proposed methods may be used for arbitrary polygon mesh, but even though only a triangle mesh may have been used for demonstration of various embodiments. As noted above, it will be assumed that an input mesh may contain one or multiple instances, that a submesh is a part of input mesh with an instance or multiple instance, and that multiple instances can be grouped to form a submesh.

The techniques described above, can be implemented as computer software using computer-readable instructions and physically stored in one or more computer-readable media or by a specifically configured one or more hardware processors. For example, FIG. 24 shows a computer system 2400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 24 for computer system 2400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 2400.

Computer system 2400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 2401, mouse 2402, trackpad 2403, touch screen 2410, joystick 2405, microphone 2406, scanner 2408, camera 2407.

Computer system 2400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 2410, or joystick 2405, but there can also be tactile feedback devices that do not serve as input devices), audio output devices (such as: speakers 2409, headphones (not depicted)), visual output devices (such as screens 2410 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 2400 can also include human accessible storage devices and their associated media such as optical media including CD/DVD ROM/RW 2420 with CD/DVD 2411 or the like media, thumb-drive 2422, removable hard drive or solid state drive 2423, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 2400 can also include interface 2499 to one or more communication networks 2498. Networks 2498 can for example be wireless, wireline, optical. Networks 2498 can further be local, wide-area, metropolitan, vehicular and industrial, real-time, delay-tolerant, and so on. Examples of networks 2498 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 2498 commonly require external network interface adapters that attached to certain general-purpose data ports or peripheral buses (2450 and 2451) (such as, for example USB ports of the computer system 2400; others are commonly integrated into the core of the computer system 2400 by attachment to a system bus as described below (for example Ethernet interface into a PC computer system or cellular network interface into a smartphone computer system). Using any of these networks 2498, computer system 2400 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 2440 of the computer system 2400.

The core 2440 can include one or more Central Processing Units (CPU) 2441, Graphics Processing Units (GPU) 2442, a graphics adapter 2417, specialized programmable processing units in the form of Field Programmable Gate Areas (FPGA) 2443, hardware accelerators for certain tasks 2444, and so forth. These devices, along with Read-only memory (ROM) 2445, Random-access memory 2446, internal mass storage such as internal non-user accessible hard drives, SSDs, and the like 2447, may be connected through a system bus 2448. In some computer systems, the system bus 2448 can be accessible in the form of one or more physical plugs to enable extensions by additional CPUs, GPU, and the like. The peripheral devices can be attached either directly to the core's system bus 2448, or through a peripheral bus 2449. Architectures for a peripheral bus include PCI, USB, and the like.

CPUs 2441, GPUs 2442, FPGAs 2443, and accelerators 2444 can execute certain instructions that, in combination, can make up the aforementioned computer code. That computer code can be stored in ROM 2445 or RAM 2446. Transitional data can be also be stored in RAM 2446, whereas permanent data can be stored for example, in the internal mass storage 2447. Fast storage and retrieval to any of the memory devices can be enabled through the use of cache memory, that can be closely associated with one or more CPU 2441, GPU 2442, mass storage 2447, ROM 2445, RAM 2446, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 2400, and specifically the core 2440 can provide functionality as a result of processor(s)

(including CPUs, GPUs, FPGA, accelerators, and the like) executing software embodied in one or more tangible, computer-readable media. Such computer-readable media can be media associated with user-accessible mass storage as introduced above, as well as certain storage of the core 2440 that are of non-transitory nature, such as core-internal mass storage 2447 or ROM 2445. The software implementing various embodiments of the present disclosure can be stored in such devices and executed by core 2440. A computer-readable medium can include one or more memory devices or chips, according to particular needs. The software can cause the core 2440 and specifically the processors therein (including CPU, GPU, FPGA, and the like) to execute particular processes or particular parts of particular processes described herein, including defining data structures stored in RAM 2446 and modifying such data structures according to the processes defined by the software. In addition or as an alternative, the computer system can provide functionality as a result of logic hardwired or otherwise embodied in a circuit (for example: accelerator 2444), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, the method performed by at least one processor and comprising:
receiving a bitstream comprising a mesh representing an encoded volumetric data of at least one three-dimensional (3D) visual content, the mesh comprising a group of frames including a current frame and a reference frame;
obtaining, from the received bitstream, a high-level variable indicating a motion field for the mesh, the motion field comprises a difference between a first vertex position in the current frame and a second vertex position in the reference frame, and the high-level variable further indicating a V3C sub-bitstream, a v3c parameter set identifier (id), and an atlas id; and
decoding the mesh based at least on the high-level variable.

2. The method according to claim 1,
wherein decoding the mesh is further based on arithmetic coding-based displacement coding.

3. The method according to claim 1,
wherein the high-level variable indicating the motion field for the mesh comprises a submesh header field and a submesh data unit field, the submesh data unit field being based on a submesh type and a submesh unit size.

4. The method according to claim 1, wherein the high-level variable element indicating the motion field for the mesh comprises:

```
bmesh_submesh_layer_rbsp( ){
        submesh_header( )
        submesh_data_unit( mfh_submesh_type, SubMeshUnitSize )
        rbsp_trailing_bits( )
}.
```

5. The method according to claim 1,
wherein the high-level variable element indicating the motion field for the mesh comprises a frame header and a frame payload,
wherein the frame header comprises a frame index followed by a reference frame index, and
wherein the frame header indicates the reference frame index in an inter mode.

6. The method according to claim 5,
wherein, in the case that the frame header indicates the inter type, the frame index consists of 8 bits, the reference frame index consists of 8 bits, and the frame payload consists of a Z-bit integer where Z consists of 32 bits.

7. The method according to claim 6,
wherein the frame header consists of the frame index and the reference frame index.

8. The method according to claim 5,
wherein the frame payload comprises a Z-bit integer followed by a coded bitstream,
wherein the Z-bit integer specifies a byte size of the coded bitstream, and
wherein the coded bitstream comprises a coded representation of displacement vectors, including the first displacement vector, of the first frame.

9. The method according to claim 8,
wherein the frame payload consists of the Z-bit integer and the coded bitstream, and
wherein Z is 32.

10. The method according to claim 1, further comprising:
obtaining a concatenation of the groups of frames;
obtaining, from a first displacement bitstream of a first one of the groups of frames, a first displacement vector of a first frame of the mesh motion field of the 3D visual content;
obtaining, after decoding the first frame and from a second one of the groups of frames, a second displacement vector of a second frame of the mesh motion field the 3D visual content; and
decoding the second frame of the 3D visual content based on the second displacement vector,
wherein the first one of the groups of frames comprises a first sequence header bitstream, a first base mesh bitstream, the first displacement bitstream, and a first texture bitstream, and
wherein the second one of the groups of frames comprises a second sequence header bitstream, a second base mesh bitstream, the second displacement bitstream, and a second texture bitstream.

11. A method for video encoding, the method performed by at least one processor and comprising:
receiving a mesh representing an volumetric data of at least one three-dimensional (3D) visual content, the mesh comprising a group of frames including a current frame and a reference frame;
determining a high-level variable indicating a motion field for the mesh, the motion field comprises a difference between a first vertex position in the current frame and a second vertex position in the reference frame, and the high-level variable further indicating a V3C sub-bit-stream, a v3c parameter set identifier (id), and an atlas id; and encoding the mesh based at least on the high-level variable.

12. The method according to claim 11,
wherein encoding the mesh is further based on arithmetic coding-based displacement coding.

13. The method according to claim 11,
wherein the high-level variable indicating the motion field for the mesh comprises a submesh header field and a submesh data unit field, the submesh data unit field being based on a submesh type and a submesh unit size.

14. The method according to claim 11, wherein the high-level variable element indicating the motion field for the mesh comprises:

```
bmesh_submesh_layer_rbsp( ){
        submesh_header( )
        submesh_data_unit( mfh_submesh_type, SubMeshUnitSize )
        rbsp_trailing_bits( )
}.
```

15. The method according to claim 11,
wherein the high-level variable element indicating the motion field for the mesh comprises a frame header and a frame payload,
wherein the frame header comprises a frame index followed by a reference frame index, and
wherein the frame header indicates the reference frame index in an inter mode.

16. A non-transitory computer-readable storage medium storing a video bitstream that is generated by a video encoding method, the video encoding method comprising:
receiving a mesh representing an volumetric data of at least one three-dimensional (3D) visual content, the mesh comprising a group of frames including a current frame and a reference frame;

determining a high-level variable indicating a motion field for the mesh, the motion field comprises a difference between a first vertex position in the current frame and a second vertex position in the reference frame, and the high-level variable further indicating a V3C sub-bit-stream, a v3c parameter set identifier (id), and an atlas id; and encoding the mesh based at least on the high-level variable.

17. The non-transitory computer-readable storage medium according to claim 16,
wherein encoding the mesh is further based on arithmetic coding-based displacement coding.

18. The non-transitory computer-readable storage medium according to claim 16,
wherein the high-level variable indicating the motion field for the mesh comprises a submesh header field and a submesh data unit field, the submesh data unit field being based on a submesh type and a submesh unit size.

19. The non-transitory computer-readable storage medium according to claim 16, wherein the high-level variable element indicating the motion field for the mesh comprises:
```
bmesh_submesh_layer_rbsp( ){
        submesh_header( )
        submesh_data_unit(mfh_submesh_type,        SubMes-
            hUnitSize)
        rbsp_trailing_bits( )
}.
```
20. The non-transitory computer-readable storage medium according to claim 16,
wherein the high-level variable element indicating the motion field for the mesh comprises a frame header and a frame payload,
wherein the frame header comprises a frame index followed by a reference frame index, and
wherein the frame header indicates the reference frame index in an inter mode.

* * * * *